(12) United States Patent
Schaff et al.

(10) Patent No.: US 10,761,543 B2
(45) Date of Patent: Sep. 1, 2020

(54) MACHINE GUIDANCE PITCH AND ROLL COMPENSATION

(71) Applicant: Trimble Inc., Sunnyvale, CA (US)

(72) Inventors: Dietrich Schaff, Fremont, CA (US); Doug Brewer, Sunnyvale, CA (US); Jeremy Hopper, Shelbyville, IL (US)

(73) Assignee: Trimble Inc., Sunnyvale, CA (US)

( * ) Notice: Subject to any disclaimer, the term of this patent is extended or adjusted under 35 U.S.C. 154(b) by 62 days.

(21) Appl. No.: 15/940,316

(22) Filed: Mar. 29, 2018

(65) Prior Publication Data

US 2019/0302799 A1     Oct. 3, 2019

(51) Int. Cl.
*G05D 1/02* (2020.01)
*G05D 1/00* (2006.01)
(Continued)

(52) U.S. Cl.
CPC ......... *G05D 1/0285* (2013.01); *A01B 69/008* (2013.01); *G01C 21/20* (2013.01);
(Continued)

(58) Field of Classification Search
CPC .......... G05D 1/0285; G05D 1/00; G05D 1/02; A01D 46/26; A01D 41/14; G06F 19/00; G06F 7/00; G01B 5/14
See application file for complete search history.

(56) References Cited

U.S. PATENT DOCUMENTS 6,694,260 B1 * 2/2004 Rekow ................. G01C 21/165
280/5.5

2003/0208311 A1 * 11/2003 McClure ................. G01S 19/41
701/50

(Continued)

FOREIGN PATENT DOCUMENTS

WO         00/58801 A1    10/2000

OTHER PUBLICATIONS

"Trimble GPS, guidance and precision agriculture solutions for all seasons, all crops, all terrains, all vehicles. Fall 2010 Trimble Agriculture Product Portfolio", Dec. 31, 2010, XP055607125, Retrieved from the Internet: URL:http://www.gpsags.com/media/2010-Trimble-Brochure.pdf [retrieved on Jul. 18, 2019], 15 pages.
Extended European Search Report for Application No. 19161499.9, dated Jul. 31, 2019, 8 pages.

(Continued)

*Primary Examiner* — Yuri Kan
(74) *Attorney, Agent, or Firm* — Kilpatrick Townsend & Stockton

(57) ABSTRACT

Systems and methods for steering a mobile agricultural machine to align a guidance point with a guidance line. One method includes setting the guidance point and setting the guidance line. The method also includes receiving, from an orientation sensor mounted on the mobile agricultural machine, orientation information including one or both of a pitch angle and a roll angle of the mobile agricultural machine. The method further includes calculating an orientation correction based on the orientation information. The method also includes modifying the guidance point using the orientation correction and steering the mobile agricultural machine to align the modified guidance point with the guidance line and/or modifying the guidance line using the orientation correction and steering the mobile agricultural machine to align the guidance point with the modified guidance line.

17 Claims, 20 Drawing Sheets

(51) Int. Cl.

| | |
|---|---|
| *A01D 41/14* | (2006.01) |
| *A01B 69/04* | (2006.01) |
| *G01C 21/20* | (2006.01) |
| *G01S 19/45* | (2010.01) |
| *G01S 19/14* | (2010.01) |
| *G01S 19/40* | (2010.01) |

(52) U.S. Cl.
CPC .............. *G01S 19/14* (2013.01); *G01S 19/45* (2013.01); *G05D 1/027* (2013.01); *G05D 1/0219* (2013.01); *G05D 1/0227* (2013.01); *G05D 1/0278* (2013.01); *G01S 19/40* (2013.01); *G05D 2201/0201* (2013.01)

(56) References Cited

U.S. PATENT DOCUMENTS

| | | | | |
|---|---|---|---|---|
| 2008/0155953 | A1* | 7/2008 | Cleodolphi | A01D 41/141 56/10.2 E |
| 2011/0054729 | A1* | 3/2011 | Whitehead | G01S 19/35 701/31.4 |
| 2011/0118926 | A1* | 5/2011 | Peake | G05D 1/0227 701/25 |
| 2016/0161238 | A1* | 6/2016 | Pitzer | A01D 46/30 56/10.2 E |
| 2016/0219786 | A1* | 8/2016 | Needham | A01D 46/26 |

OTHER PUBLICATIONS

Office Action for Application No. 19 161 499.9-1202, dated May 4, 2020, 5 pages.

\* cited by examiner

MACHINE GUIDANCE PITCH AND ROLL COMPENSATION

BACKGROUND

Modern mobile agricultural machines have dramatically increased the efficiency of harvesting a variety of grain crops, including wheat, corn, oats, rye, barley, among others. Such machines may be guided in part by various cameras and sensors mounted to the machines, such as one or more global navigation satellite systems (GNSS) receivers which use wireless signals transmitted from medium Earth orbit (MEO) satellites to generate position estimates of the machines. Despite the improvements in machine guiding systems, the harvesting efficiency remains limited due to the inability to correctly receive crops at target locations on the machine's header when the machine is influenced by a sloping and uneven terrain.

Examples of currently operational GNSSs include the United States' Global Positioning System (GPS), the Russian Global Navigation Satellite System (GLONASS), the Chinese BeiDou Satellite Navigation System, and the European Union's (EU) Galileo. Today, GNSS receivers are used in a wide range of applications, including navigation (e.g., for automobiles, planes, boats, persons, animals, freight, military precision-guided munitions, etc.), surveying, mapping, and time referencing. Additional applications for using GNSS technology for mobile agricultural machines will become available as new techniques for improving GNSS accuracy are introduced.

SUMMARY

In a first aspect of the present invention, a method for steering a mobile agricultural machine to align a guidance point with a guidance line is provided. The method may include setting the guidance point. The method may also include setting the guidance line. The method may further include receiving, from an orientation sensor mounted on the mobile agricultural machine, orientation information including one or both of a pitch angle and a roll angle of the mobile agricultural machine. In some embodiments, the method may include calculating an orientation correction based on the orientation information. The method may also include performing at least one of modifying the guidance point using the orientation correction and steering the mobile agricultural machine to align the modified guidance point with the guidance line, and modifying the guidance line using the orientation correction and steering the mobile agricultural machine to align the guidance point with the modified guidance line.

In some embodiments, the mobile agricultural machine includes a global navigation satellite system (GNSS) receiver for calculating a geospatial position of the GNSS receiver. In some embodiments, setting the guidance point includes receiving, from the GNSS receiver, the geospatial position of the GNSS receive and setting the guidance point based on a known physical relationship between the GNSS receiver and the guidance point. In some embodiments, setting the guidance line includes receiving a crop line corresponding to geospatial positions of a plurality of planted crops and setting at least part of the guidance line equal to at least part of the crop line. In some embodiments, calculating the orientation correction includes calculating an antenna-based orientation correction based on a height of the GNSS receiver and the orientation information. In some embodiments, calculating the orientation correction includes calculating a header-based orientation correction based on a height of a header of the mobile agricultural machine and the orientation information. In some embodiments, the method also includes receiving a misalignment signal from a contact-based path sensor mounted on a header of the mobile agricultural machine, calculating a path correction based on the misalignment signal, and modifying one or both of the guidance point and the guidance line using the path correction.

In a second aspect of the present invention, a system for steering a mobile agricultural machine to align a guidance point with a guidance line is provided. The system may include an orientation sensor mounted on the mobile agricultural machine. The system may also include one or more processors in data communication with the orientation sensor. The one or more processors may be configured to perform operations including the method according to the first aspect of the present invention. The system may further include a GNSS receiver mounted on the mobile agricultural machine for calculating a geospatial position of the GNSS receiver. In some embodiments, the system includes a contact-based path sensor mounted on a header of the mobile agricultural machine.

In a third aspect of the present invention, a non-transitory computer readable medium is provided. In some embodiments, the non-transitory computer readable medium includes instructions that, when executed by a processing unit, cause the processing unit to perform operations including the method according to the first aspect of the present invention.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION

Embodiments of the present disclosure relate to systems, methods, and other techniques for guiding a mobile agricultural machine, such as a combine harvester, while the mobile agricultural machine is harvesting a sloped or uneven field. Conventional guidance systems that do not account for sloped surfaces produce lower harvesting yields due to crops not being correctly received by the machine's header. In contrast, embodiments described herein can modify the guidance line being followed by the mobile agricultural machine based on a detected orientation of the machine and the heights of the antenna and the header. By incorporating both antenna height and header height into the guidance calculation, harvesting efficiency is improved along with overall operation profitability.

Figure 1:
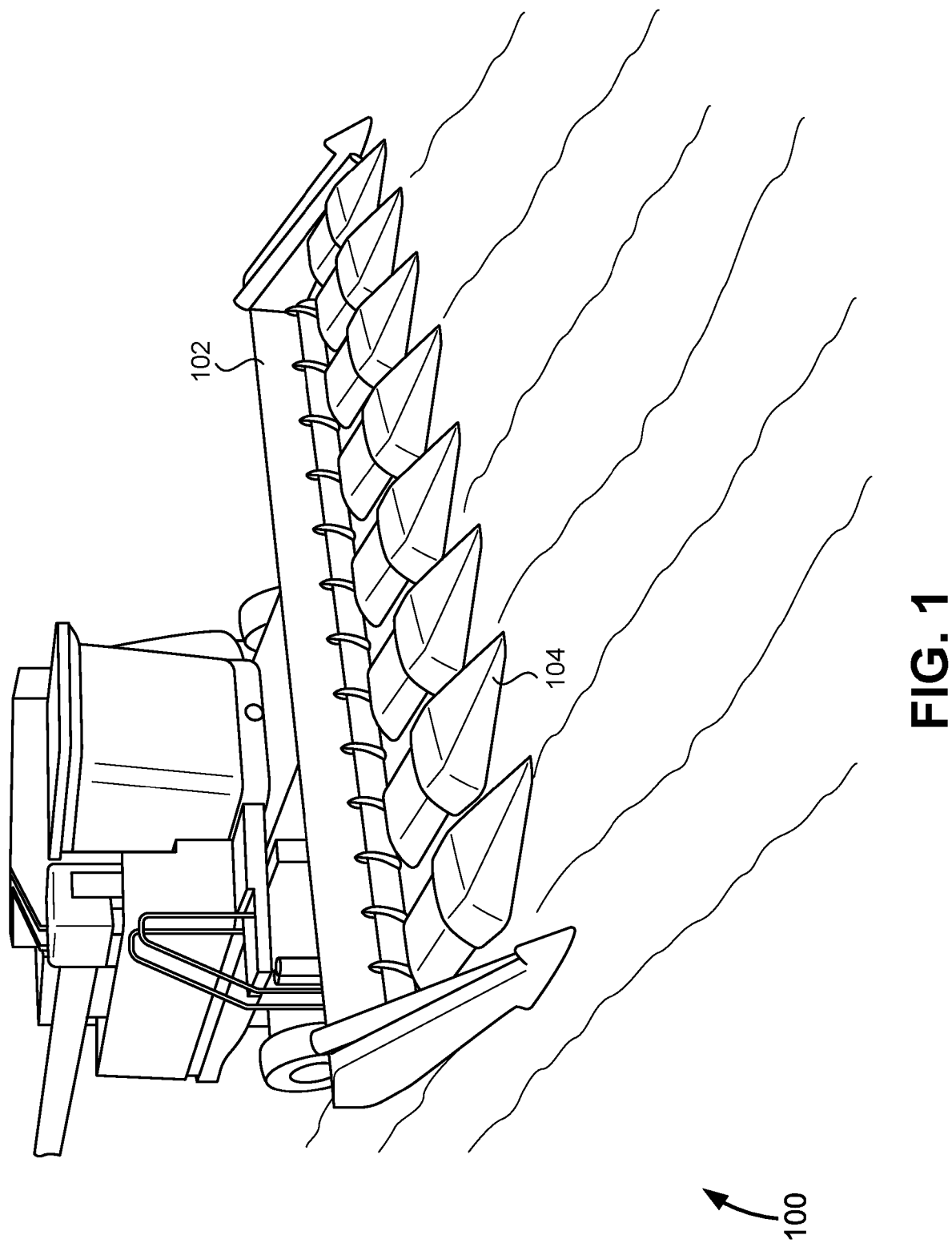
FIG. 1 illustrates a perspective view of a mobile agricultural machine, according to some embodiments of the present disclosure.

FIG. 1 illustrates a perspective view of a mobile agricultural machine 100, according to some embodiments of the present disclosure. Although illustrated as a combine harvester, mobile agricultural machine 100 may be a tractor, a baler, a plow, a cultivator, a planter, a mower, a thresher, among other possibilities. Mobile agricultural machine 100 may include a header 102 mounted onto the front of mobile agricultural machine 100 designed for interacting with a particular crop. In the particular implementation shown in FIG. 1, header 102 includes a plurality of cones 104 for separating and guiding rows of crops into the various harvesting mechanisms included in header 102.

Figure 2:
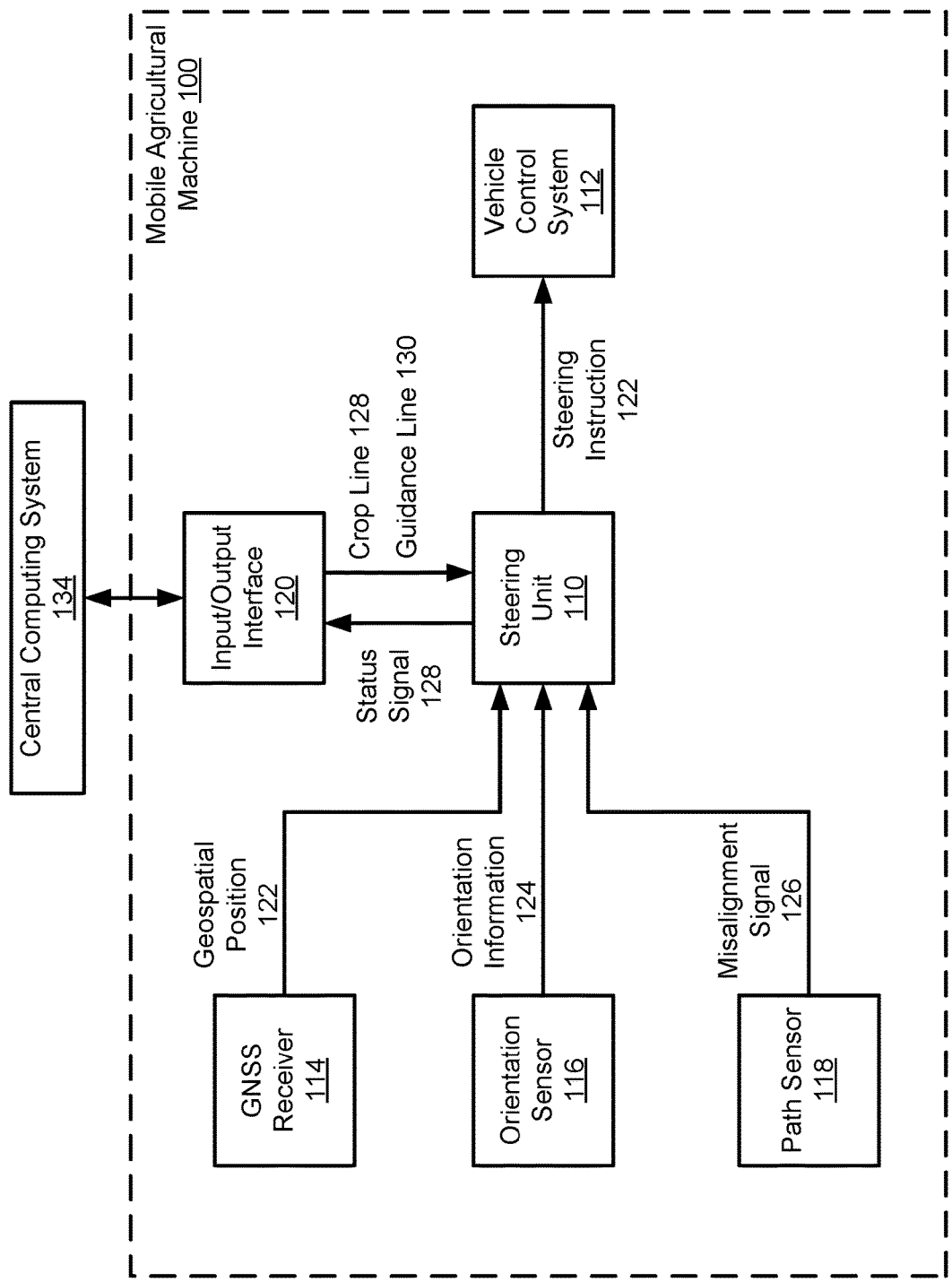
FIG. 2 illustrates a block diagram of a mobile agricultural machine, according to some embodiments of the present disclosure.

FIG. 2 illustrates a block diagram of mobile agricultural machine 100, according to some embodiments of the present disclosure. Mobile agricultural machine 100 may include a steering unit 110 for generating and sending a steering instruction 122 to a vehicle control system 112. Steering unit 110 may include one or more processors configured to execute one or more computer-readable instructions stored in a non-transitory memory. In response to receiving steering instruction 122 from steering unit 110, vehicle control system 112 may steer mobile agricultural machine 100 in accordance with steering instruction 122. In some embodiments, steering unit 110 is integrated with vehicle control system 112.

To facilitate in generating steering instruction 122, steering unit 110 may receive sensor data from one or more sensors such as a global navigation satellite systems (GNSS) receiver 114, an orientation sensor 116, and a path sensor 118. GNSS receiver 114 may be mounted to mobile agricultural machine 100. In one particular implementation, GNSS receiver 114 is mounted to a highest point of mobile agricultural machine 100 to increase the signal-to-noise ratio (SNR) of the received GNSS signal. GNSS receiver 114 may be configured to detect a geospatial position 122 of GNSS receiver 114, which may include a 2D or 3D coordinate corresponding to, for example, an X, Y, and Z position, or a longitude, latitude, and elevation of GNSS receiver 114. GNSS receiver 114 is described further in reference to FIGS. 13 and 14.

Orientation sensor 116 may be mounted to mobile agricultural machine 100 and may be configured to detect orientation information 124 of mobile agricultural machine 100. In some embodiments, orientation sensor 116 is an inertial measurement unit (IMU) comprising a combination of accelerometers and gyroscopes. Orientation sensor 116 may be mounted to a highest point of mobile agricultural machine 100 to increase the amount of torque experienced by orientation sensor 116 thereby increasing the SNR of any generated signals. In some embodiments, orientation sensor 116 is mounted to header 102. Orientation information 124 may include one or more of a roll angle $\theta_{ROLL}$, a pitch angle $\theta_{PITCH}$, and a yaw angle $\theta_{PITCH}$ of mobile agricultural machine 100.

Figure 3:
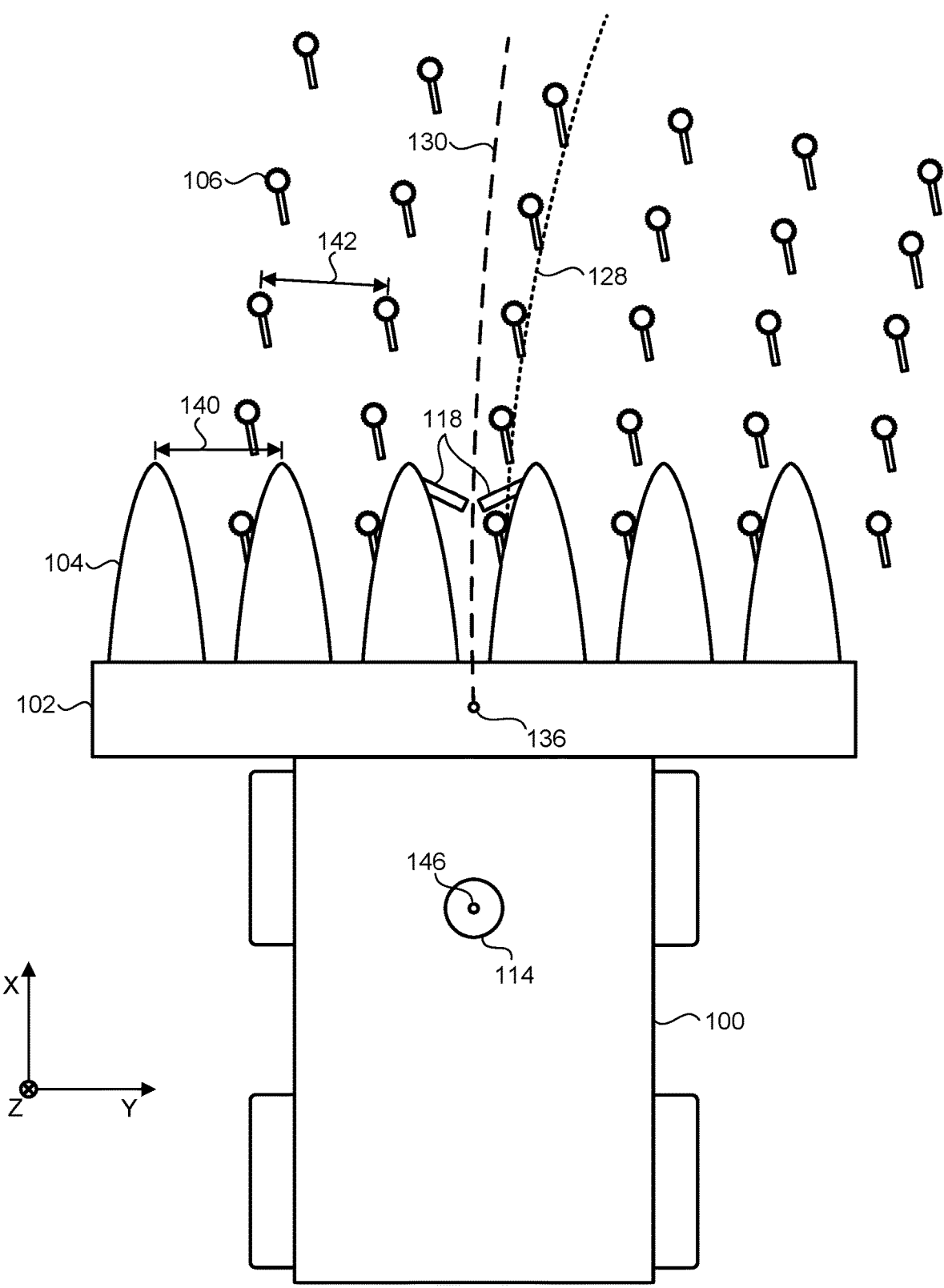
FIG. 3 illustrates a top view of a mobile agricultural machine, according to some embodiments of the present disclosure.

Path sensor 118 may be a touch-based sensor configured to detect a collision or force between path sensor 118 and crop 106. Path sensor 118 may be mounted to a portion of header 102. Specifically, and as illustrated in FIG. 3, path sensor 118 may be mounted to one or more of cones 104. In one particular implementation, path sensor 118 includes a pair of pivotal arms connected to sensors that generate an output corresponding to a deflection distance of the pivotal arms. Path sensor 118 may generate a misalignment signal 126 corresponding to the deflection distance. In some embodiments, path sensor 118 may not be touch-based but may be an optical sensor or an ultrasonic sensor.

In some embodiments, mobile agricultural machine 100 includes an input/output interface 120 through which communication with a central computing system 134 may be facilitated. Central computing system 134 may send instructions to mobile agricultural machine 100 to harvest a particular field or a particular row of crops 106, and steering unit 110 may send a status signal 128 indicating completion of the instructions. For example, central computing system 134 may send a crop line 128 and/or a guidance line 130 to steering unit 110. As described herein, crop line 128 may be a series of coordinates or a trajectory corresponding to geospatial positions of crops 106. For example, crop line 128 may include two 2D or 3D coordinates corresponding to end points of a row of crops 106. In another embodiment, crop line 128 may include a series of 2D or 3D coordinates corresponding to individual crops 106. Where crop line 128 includes a 3D coordinate, the coordinate may correspond to the point where crop 106 intersects with the ground, i.e., the location where the seed for crop 106 was planted. As described herein, guidance line 130 may be a series of coordinates or a trajectory that mobile agricultural machine 100 is attempting to follow. Guidance line 130 may be initialized by steering unit 110 based on crop line 128, or may be initialized by central computing system 134 and sent to steering unit 110. While following the initialized guidance line 130, steering unit may modify guidance line 130 based on one or more of geospatial position 122, orientation information 124, and misalignment signal 126.

FIG. 3 illustrates a top view of mobile agricultural machine 100, according to some embodiments of the present disclosure. While mobile agricultural machine 100 is operating, steering unit 110 may steer mobile agricultural machine 100 to align a guidance point 136 with guidance line 130 as shown in FIG. 3. To improve the harvesting efficiency, it is desirable that steering unit 110 steers mobile agricultural machine 100 such that each crop 106 is received at a midpoint between adjacent cones 104. Further refinements to the steering of mobile agricultural machine 100 may be made using path sensor 118 as the sensitivity of touch-based sensors may exceed the accuracy of current GNSS technology. In some embodiments, cones 104 may be spaced according to a cone spacing 140 which may correspond to a crop spacing 142 such that correct receipt of a crop between the center two cones results in correct receipt by the remaining cones. In the specific embodiment shown in FIG. 3, the calculated guidance line 130 does not result in correct receipt of crop 106 thereby causing a reduced harvesting efficiency.

In some embodiments, an antenna point 146 of mobile agricultural machine 100 is defined as geospatial position 122 generated by GNSS receiver 114. In some embodiments, antenna point 146 is equal to the phase center of the antenna of GNSS receiver 114 or the geometric center of GNSS receiver 114. In some embodiments, a physical relationship between antenna point 146 and guidance point 136 is known such that guidance point 136 may be updated each time geospatial position 122 is generated by GNSS receiver 114. In some embodiments, the physical relationship between antenna point 146 and guidance point 136 may be measured in factory after manufacture of mobile agricultural machine 100.

Figure 4:
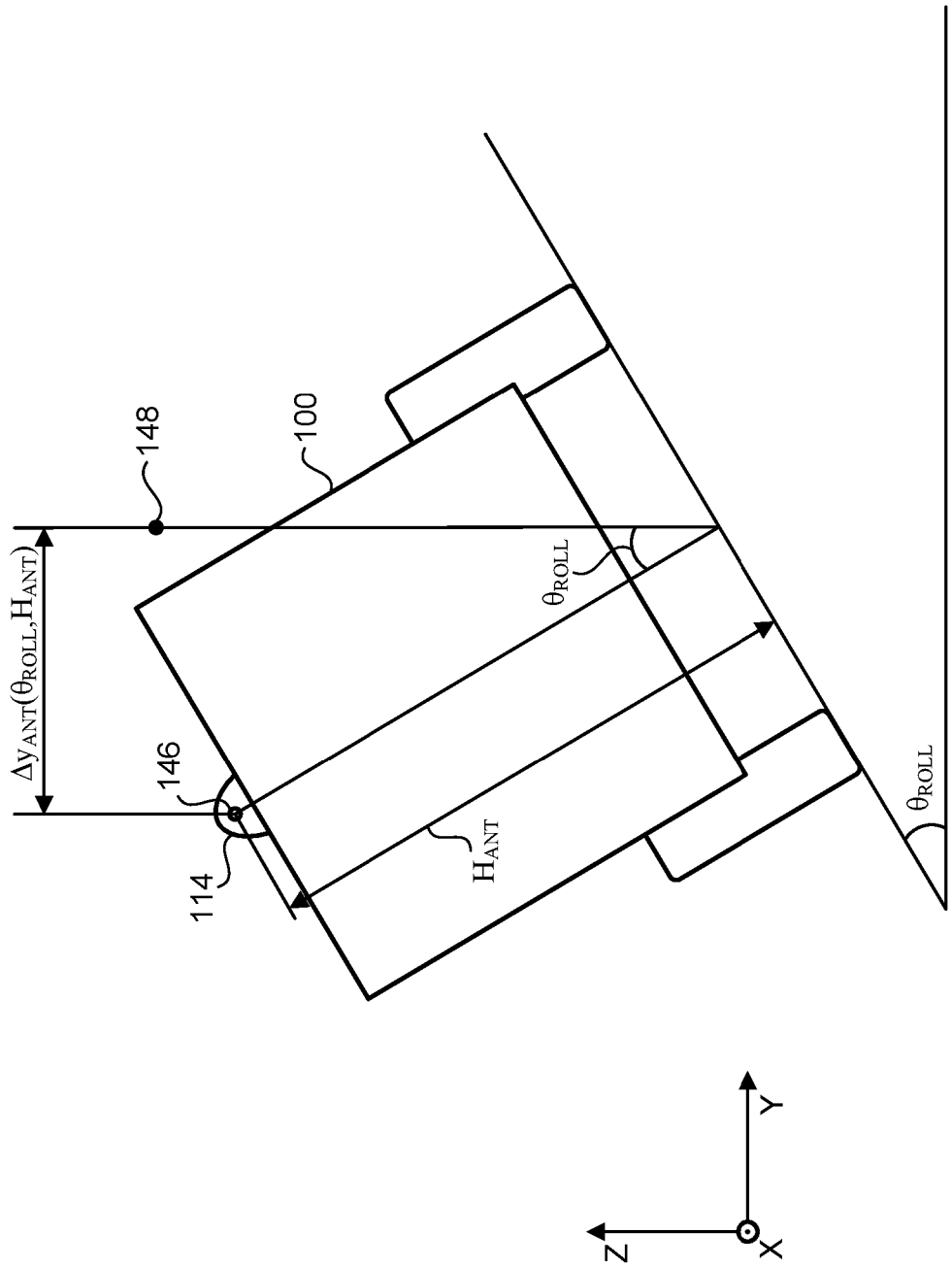
FIG. 4 illustrates a front view of a mobile agricultural machine, according to some embodiments of the present disclosure.

FIG. 4 illustrates a front view of mobile agricultural machine 100 undergoing a roll defined by roll angle $\theta_{ROLL}$, according to some embodiments of the present disclosure. To correct for the horizontal misalignment between antenna point 146 and the ground directly below the base of mobile agricultural machine 100, an antenna-based orientation correction $\Delta y_{ANT}$ may be calculated based on roll angle $\theta_{ROLL}$ and an antenna height $H_{ANT}$. In one particular embodiment, antenna-based orientation correction $\Delta y_{ANT}$ may be calculated as $\Delta y_{ANT} = H_{ANT}/\cos(\theta_{ROLL})$. A modified antenna point 148 may be calculated by adding antenna-based orientation correction $\Delta y_{ANT}$ to antenna point 146.

Figure 5:
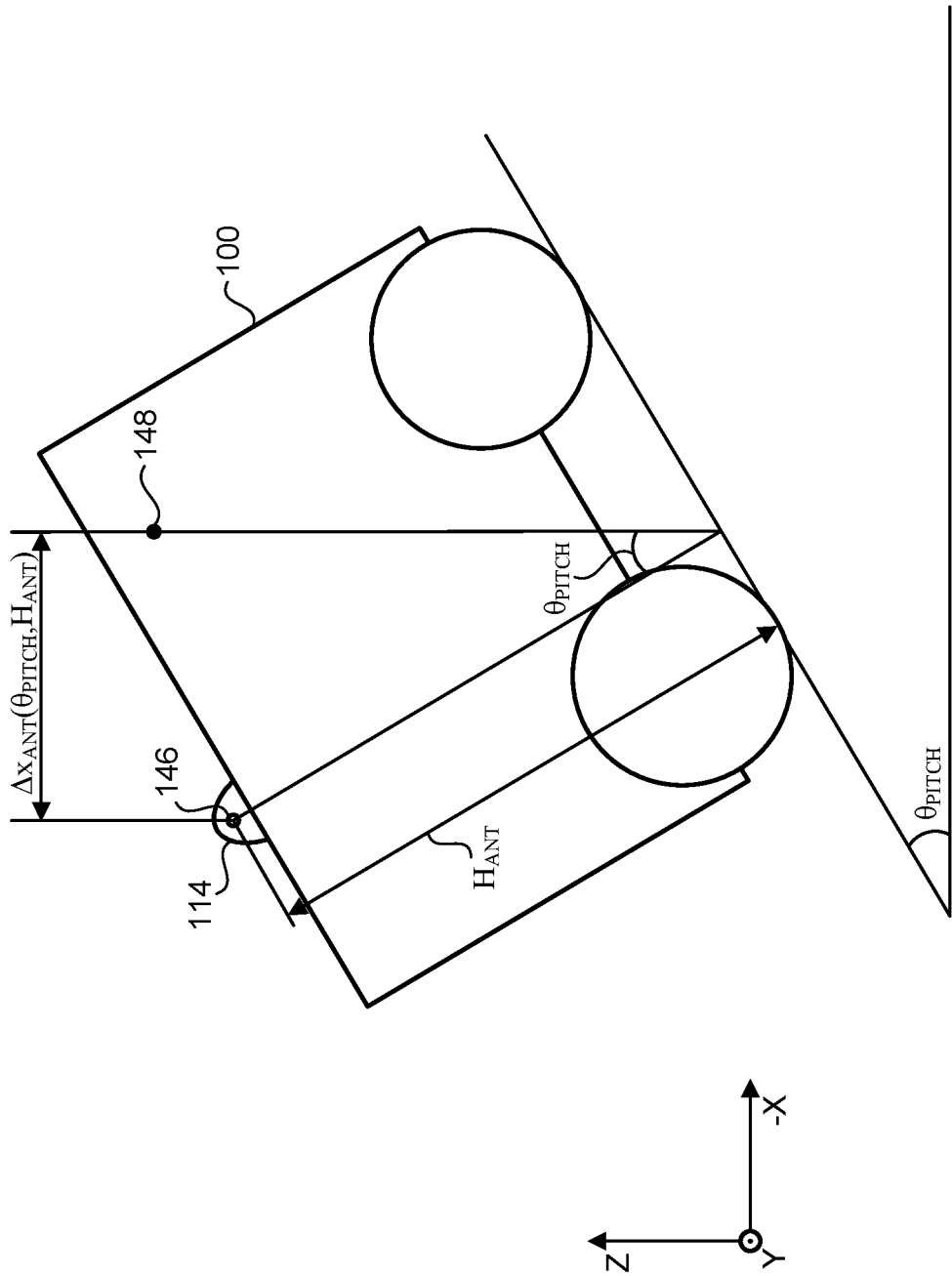
FIG. 5 illustrates a side view of a mobile agricultural machine, according to some embodiments of the present disclosure.

FIG. 5 illustrates a side view of mobile agricultural machine 100 undergoing a pitch defined by pitch angle $\theta_{PITCH}$, according to some embodiments of the present disclosure. To correct for the horizontal misalignment between antenna point 146 and the ground directly below the base of mobile agricultural machine 100, an antenna-based orientation correction $\Delta x_{ANT}$ may be calculated based on pitch angle $\theta_{PITCH}$ and antenna height $H_{ANT}$. In one particular embodiment, antenna-based orientation correction $\Delta x_{ANT}$ may be calculated as $\Delta x_{ANT} = H_{ANT}/\cos(\theta_{PITCH})$. A modified antenna point 148 may be calculated by adding antenna-based orientation correction $\Delta x_{ANT}$ to antenna point 146.

Figure 6:
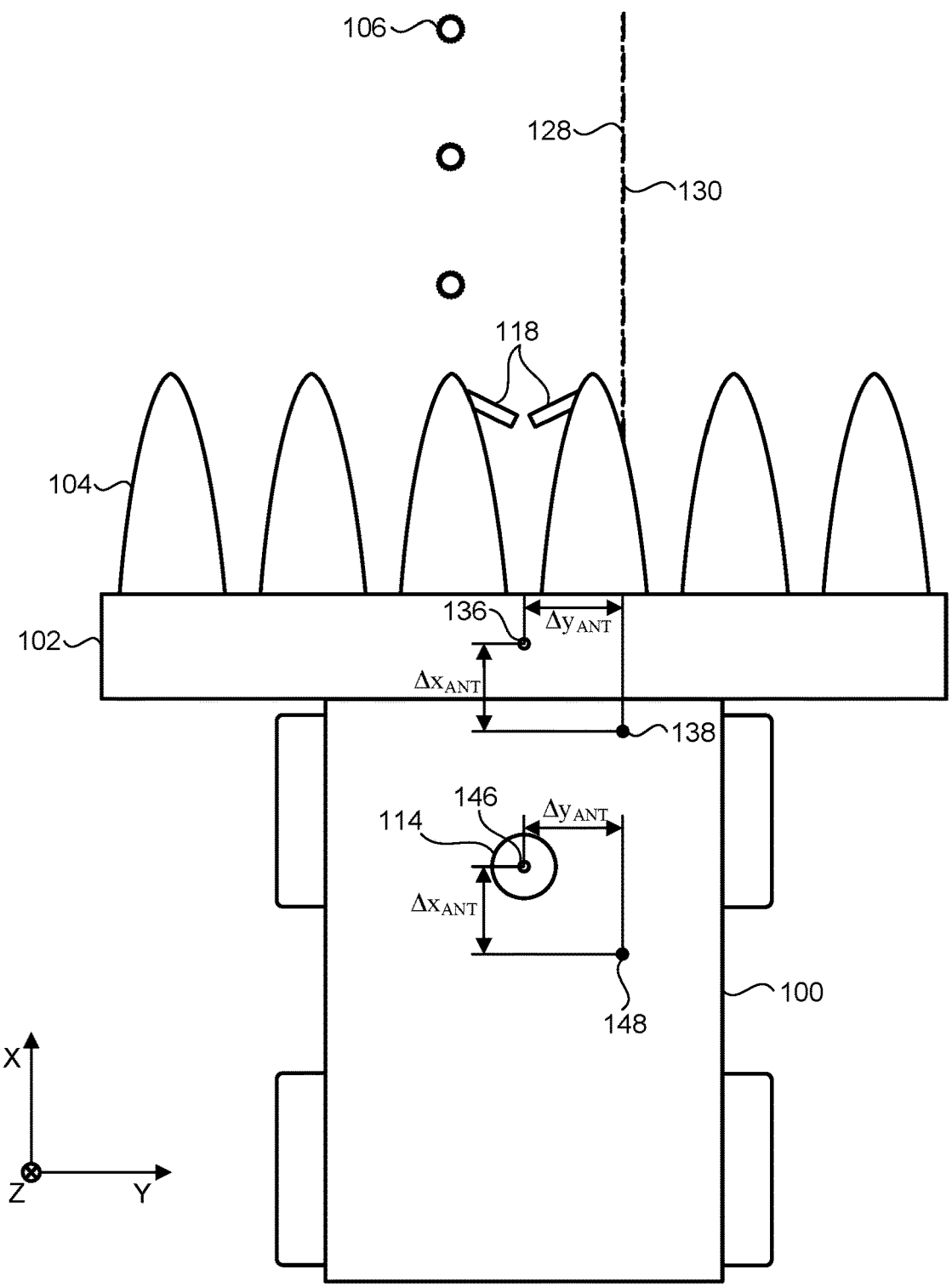
FIG. 6 illustrates a top view of a mobile agricultural machine, according to some embodiments of the present disclosure.

FIG. 6 illustrates a top view of mobile agricultural machine 100 undergoing a pitch defined by pitch angle $\theta_{PITCH}$ and a roll defined by roll angle $\theta_{ROLL}$, according to some embodiments of the present disclosure. In the example shown, guidance line 130 is initialized to crop line 128, antenna point 146 is modified by antenna-based orientation corrections $\Delta y_{ANT}$ and $\Delta x_{ANT}$ resulting in modified antenna point 148, and guidance point 136 is modified by antenna-based orientation corrections $\leftarrow y_{ANT}$ and $\Delta x_{ANT}$ resulting in modified guidance point 138. Alternatively or additionally, modified guidance point 138 may be calculated based on the known physical relationship between antenna point 146 and guidance point 136 (which is the same as the physical relationship between modified antenna point 148 and modified guidance point 138). As shown in FIG. 6, in some cases modifying guidance point 136 using only antenna-based orientation corrections does not result in correct receipt of crop 106 at a midpoint between the center two cones.

Figure 7:
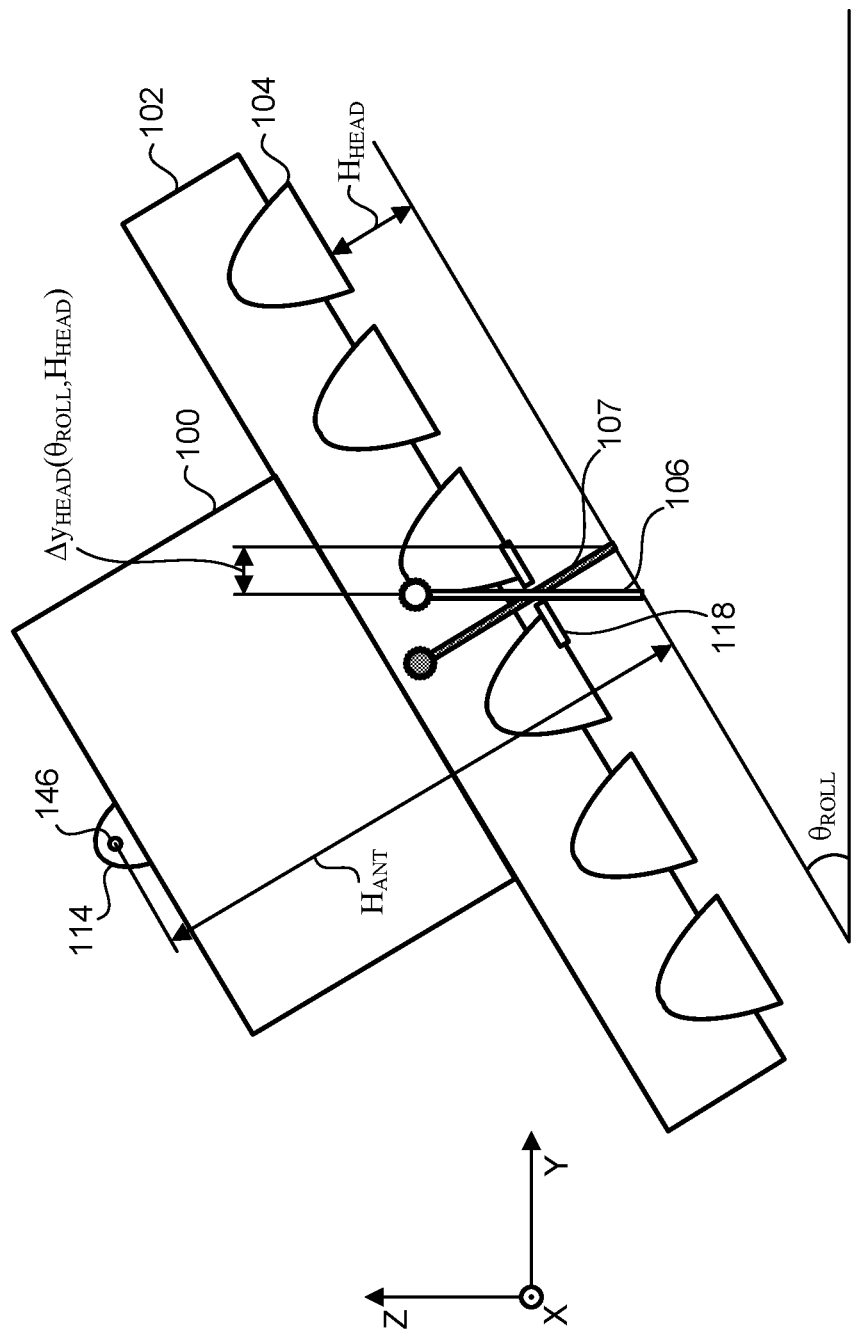
FIG. 7 illustrates a front view of a mobile agricultural machine, according to some embodiments of the present disclosure.

FIG. 7 illustrates a front view of mobile agricultural machine 100 undergoing a roll defined by roll angle $\theta_{ROLL}$, according to some embodiments of the present disclosure. FIG. 7 shows the different orientations of crop 106 and a virtual crop 107 necessary for correct receipt of the crops by header 102. Virtual crop 107 grows perpendicular to the ground and represents the orientation of the crop expected by conventional systems. Because crop 106 grows vertically with respect to the ground and not perpendicular to the ground (i.e., parallel to antenna height $H_{ANT}$), virtual crop 107 does not correspond to crop 106. To correct for the misalignment between virtual crop 107 and crop 106, a header-based orientation correction $\Delta y_{HEAD}$ may be calculated based on roll angle $\theta_{ROLL}$ and a header height $H_{HEAD}$. In one particular embodiment, header-based orientation correction $\Delta y_{HEAD}$ may be calculated as $\Delta y_{HEAD} = H_{HEAD} \cos(\theta_{ROLL})$.

Figure 8:
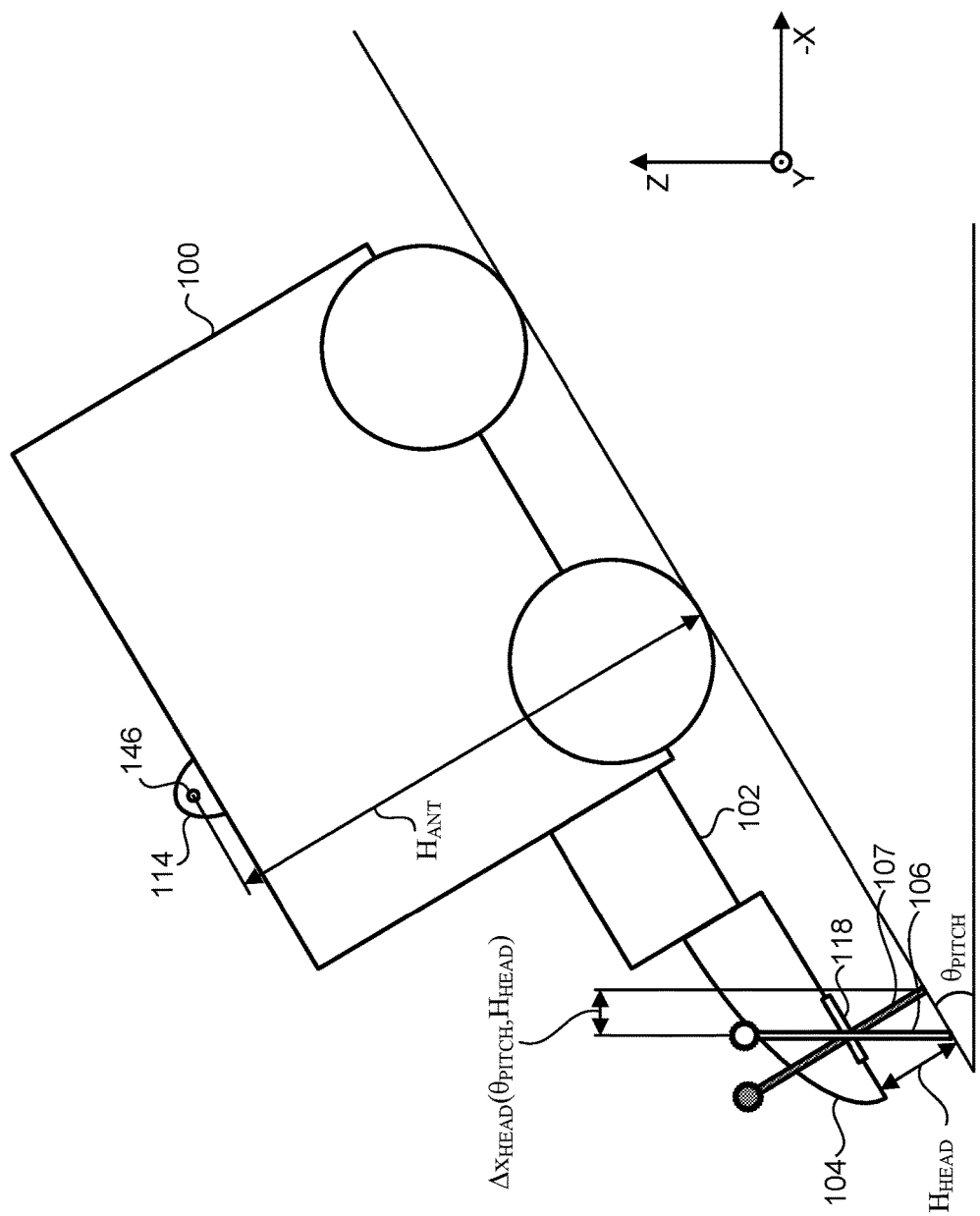
FIG. 8 illustrates a side view of a mobile agricultural machine, according to some embodiments of the present disclosure.

FIG. 8 illustrates a side view of mobile agricultural machine 100 undergoing a pitch defined by pitch angle $\theta_{PITCH}$, according to some embodiments of the present disclosure. FIG. 8 shows the different orientations of crops 106 and virtual crop 107 necessary for correct receipt of the crops by header 102. Because crop 106 grows vertically with respect to the ground and not perpendicular to the ground (i.e., parallel to antenna height $H_{ANT}$), virtual crop 107 does not correspond to crop 106. To correct for the misalignment between virtual crop 107 and crop 106, a header-based orientation correction $\Delta x_{HEAD}$ may be calculated based on pitch angle $\theta_{PITCH}$ and header height $H_{HEAD}$. In one particular embodiment, header-based orientation correction $\Delta x_{HEAD}$ may be calculated as $\Delta x_{HEAD} = H_{HEAD}/\cos(\theta_{PITCH})$.

Figure 9:
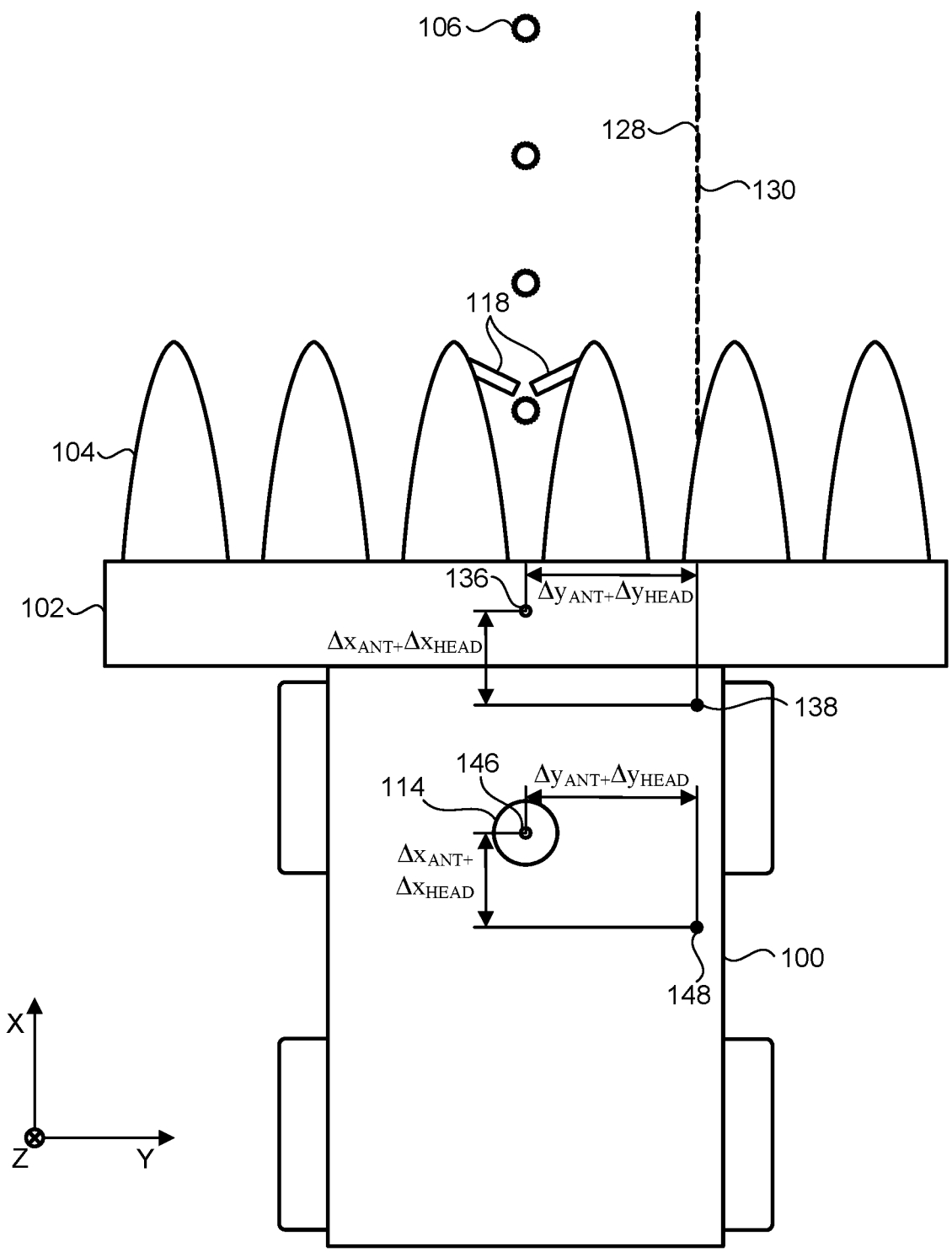
FIG. 9 illustrates a top view of a mobile agricultural machine, according to some embodiments of the present disclosure.

FIG. 9 illustrates a top view of mobile agricultural machine 100, according to some embodiments of the present disclosure. In some embodiments, correct receipt of crop 106 is achieved by applying antenna-based orientation corrections $\Delta x_{ANT}$ and $\Delta y_{ANT}$ and header-based orientation corrections $\Delta x_{HEAD}$ and $\Delta y_{HEAD}$ to guidance point 136 to produce modified guidance point 138. As shown in FIG. 9, the total orientation correction applied to guidance point 136 in the Y-direction is $\Delta y_{ANT} + \Delta y_{HEAD}$ and the total orientation correction applied to guidance point 136 in the X-direction is $\Delta x_{ANT} + \Delta x_{HEAD}$. Because all orientation corrections were applied to guidance point 136 instead of guidance line 130, guidance line 130 overlaps at least partially with crop line 128.

Figure 10:
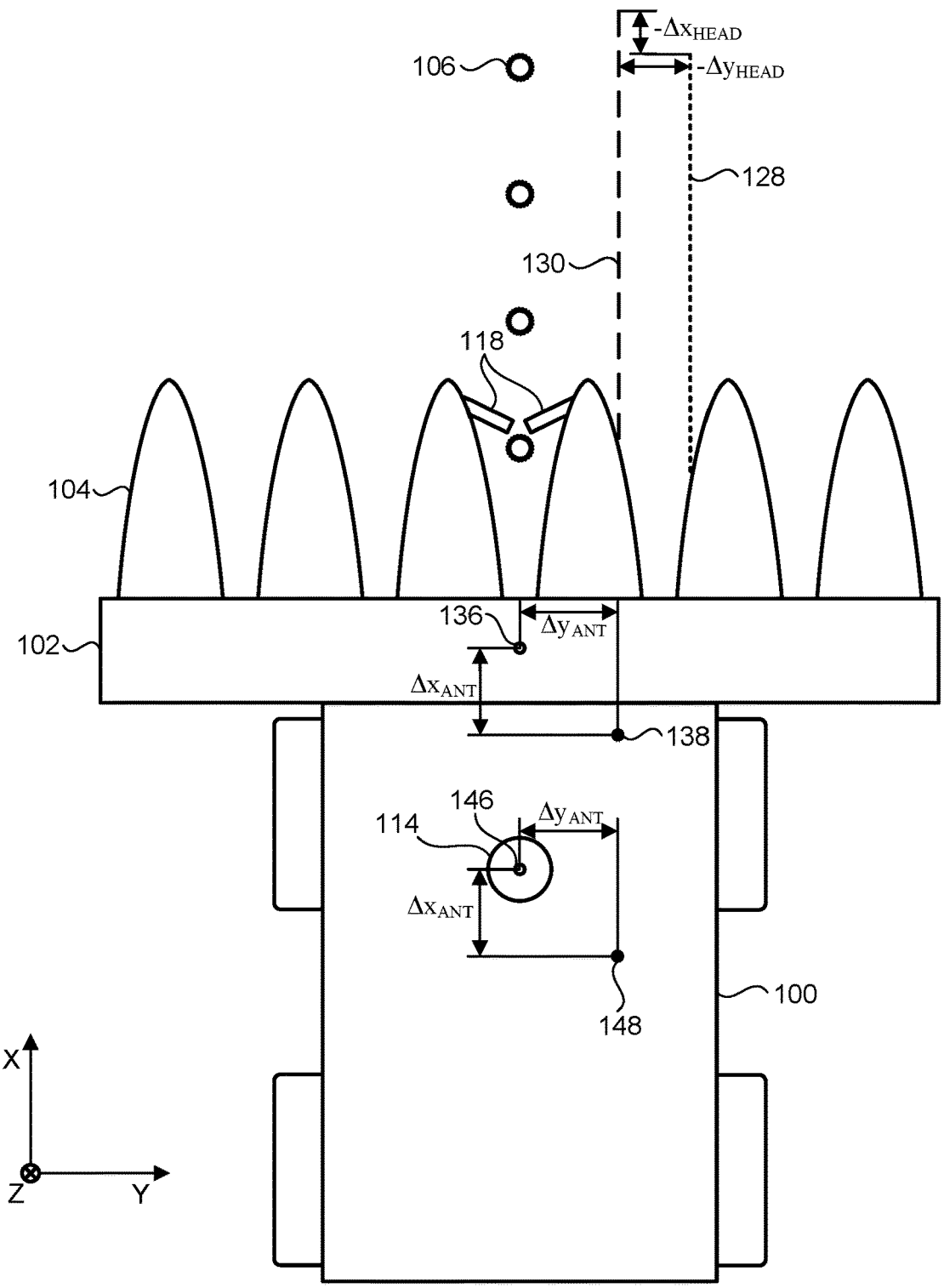
FIG. 10 illustrates a top view of a mobile agricultural machine, according to some embodiments of the present disclosure.

FIG. 10 illustrates a top view of mobile agricultural machine 100, according to some embodiments of the present disclosure. In some embodiments, correct receipt of crop 106 is achieved by applying a first portion of antenna-based orientation corrections $\Delta x_{ANT}$ and $\Delta y_{ANT}$ and header-based orientation corrections $\Delta x_{HEAD}$ and $\Delta y_{HEAD}$ to guidance point 136 to produce modified guidance point 138, and a second portion of antenna-based orientation corrections $\Delta x_{ANT}$ and $\Delta y_{ANT}$ and header-based orientation corrections $\Delta x_{HEAD}$ and $\Delta y_{HEAD}$ to crop line 128 to produce guidance line 130. Alternatively, where guidance line 130 has previously been initialized to crop line 128, the second portion of orientation corrections may be applied to guidance line 130 such that it is modified. As shown in FIG. 10, the total orientation correction applied to guidance point 136 in the Y-direction is $\Delta y_{ANT}$ and the total orientation correction applied to guidance point 136 in the X-direction is $\Delta x_{ANT}$, and the total orientation correction applied to crop line 128 in the Y-direction is $-\Delta y_{HEAD}$ and the total orientation correction applied to crop line 128 in the X-direction is $-\Delta x_{HEAD}$.

Figure 11:
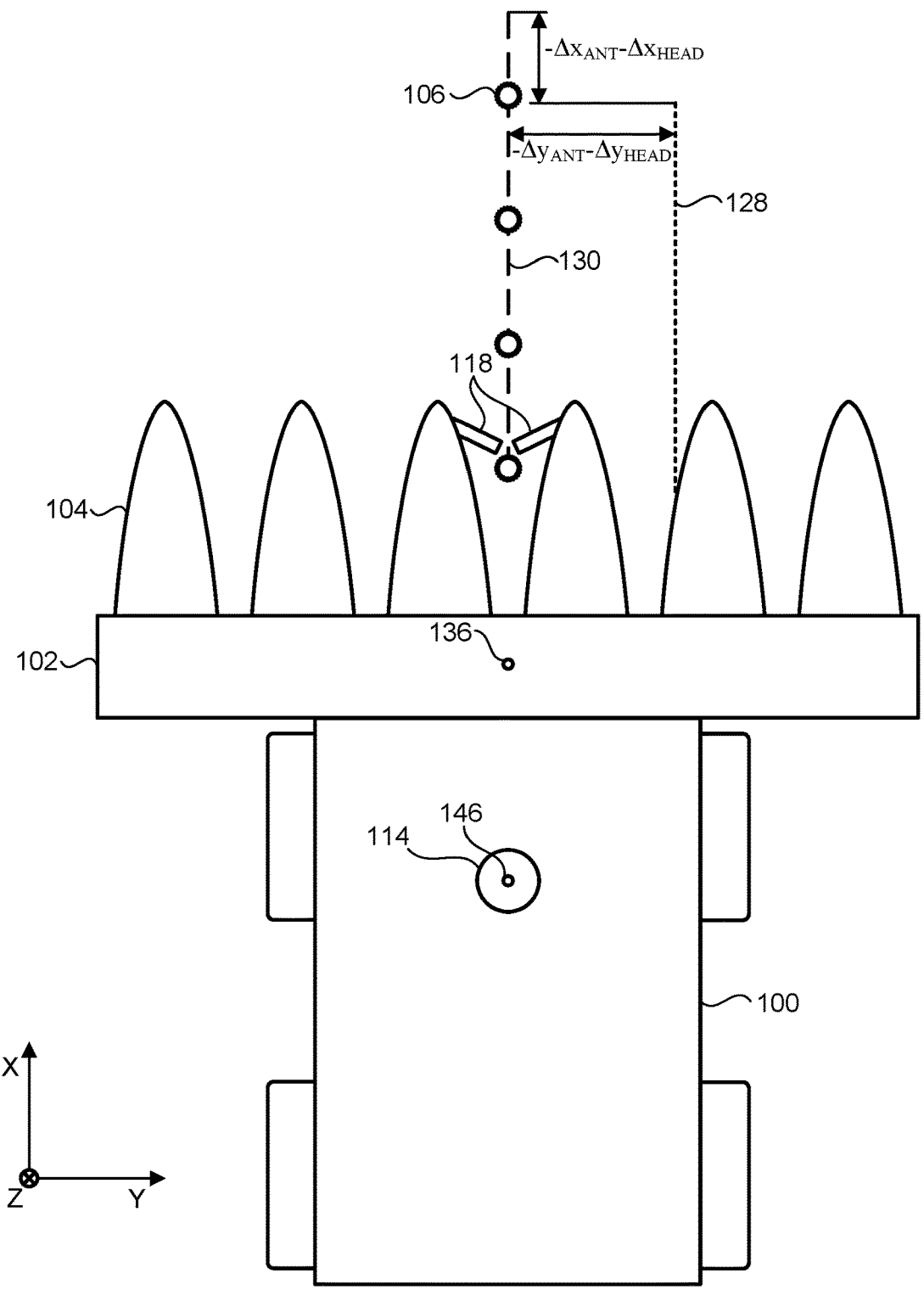
FIG. 11 illustrates a top view of a mobile agricultural machine, according to some embodiments of the present disclosure.

FIG. 11 illustrates a top view of mobile agricultural machine 100, according to some embodiments of the present disclosure. In some embodiments, correct receipt of crop 106 is achieved by applying antenna-based orientation corrections $\Delta x_{ANT}$ and $\Delta y_{ANT}$ and header-based orientation corrections $\Delta x_{HEAD}$ and $\Delta y_{HEAD}$ to crop line 128 to produce guidance line 130. Alternatively, where guidance line 130 has previously been initialized to crop line 128, the orientation corrections may be applied to guidance line 130 such that it is modified. As shown in FIG. 11, the total orientation correction applied to crop line 128 in the Y-direction is $-\Delta y_{ANT}-\Delta y_{HEAD}$ and the total orientation correction applied to crop line 128 in the X-direction is $-\Delta x_{ANT}-\Delta x_{HEAD}$.

Figure 12A:
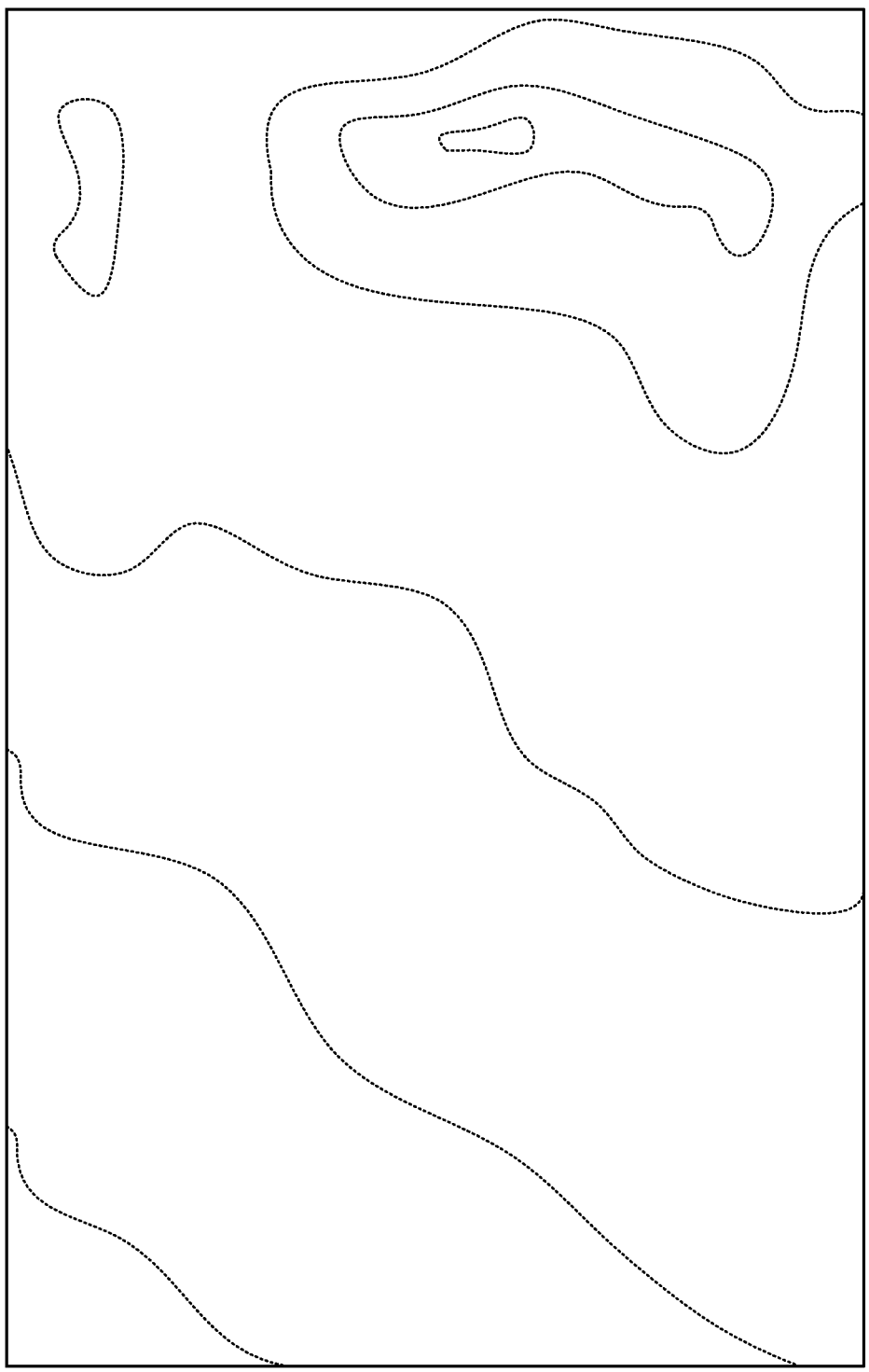
FIGS. 12A-12E illustrate various steps for harvesting crops planted in a field, according to some embodiments of the present disclosure.
Figure 12B:
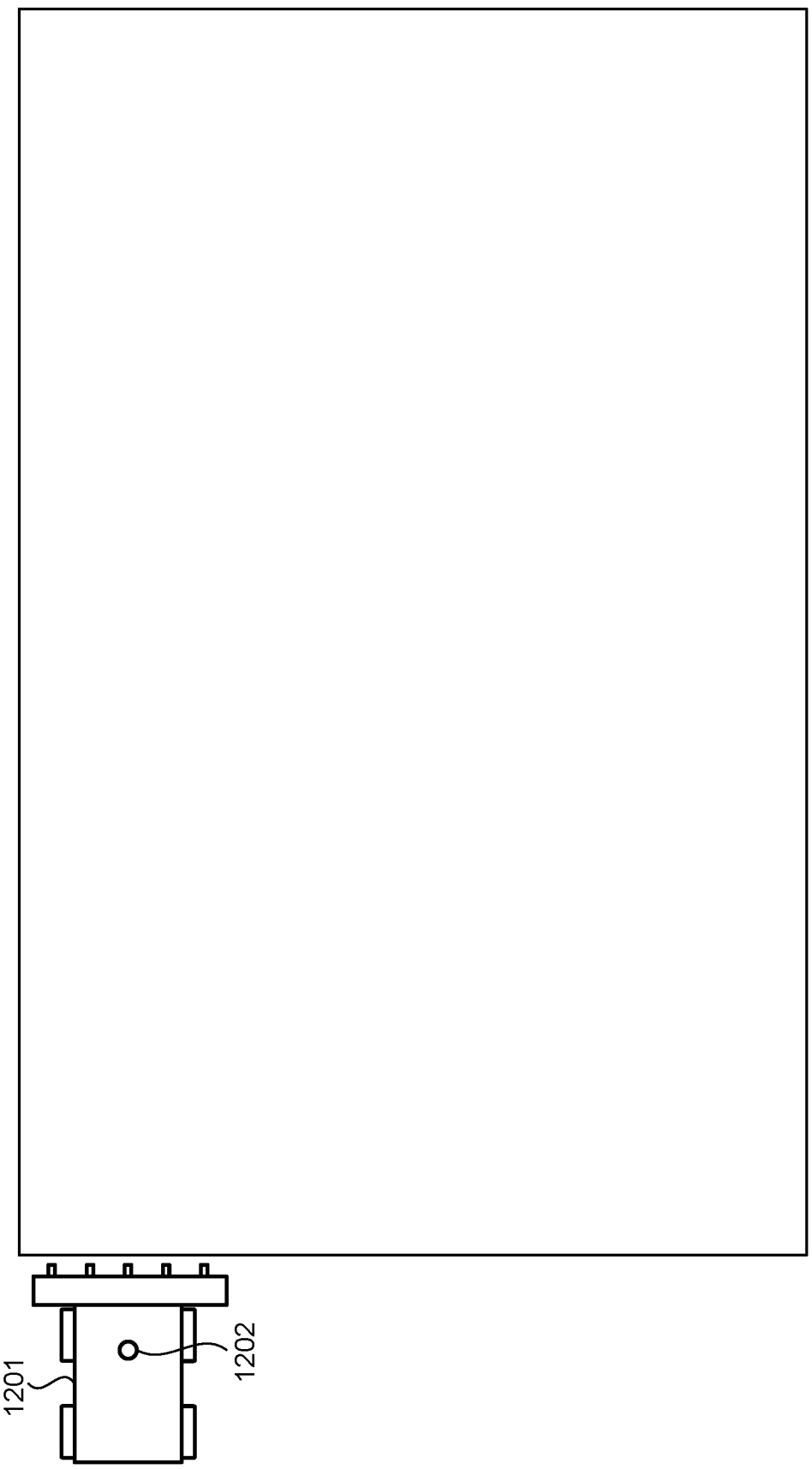
Figure 12C:
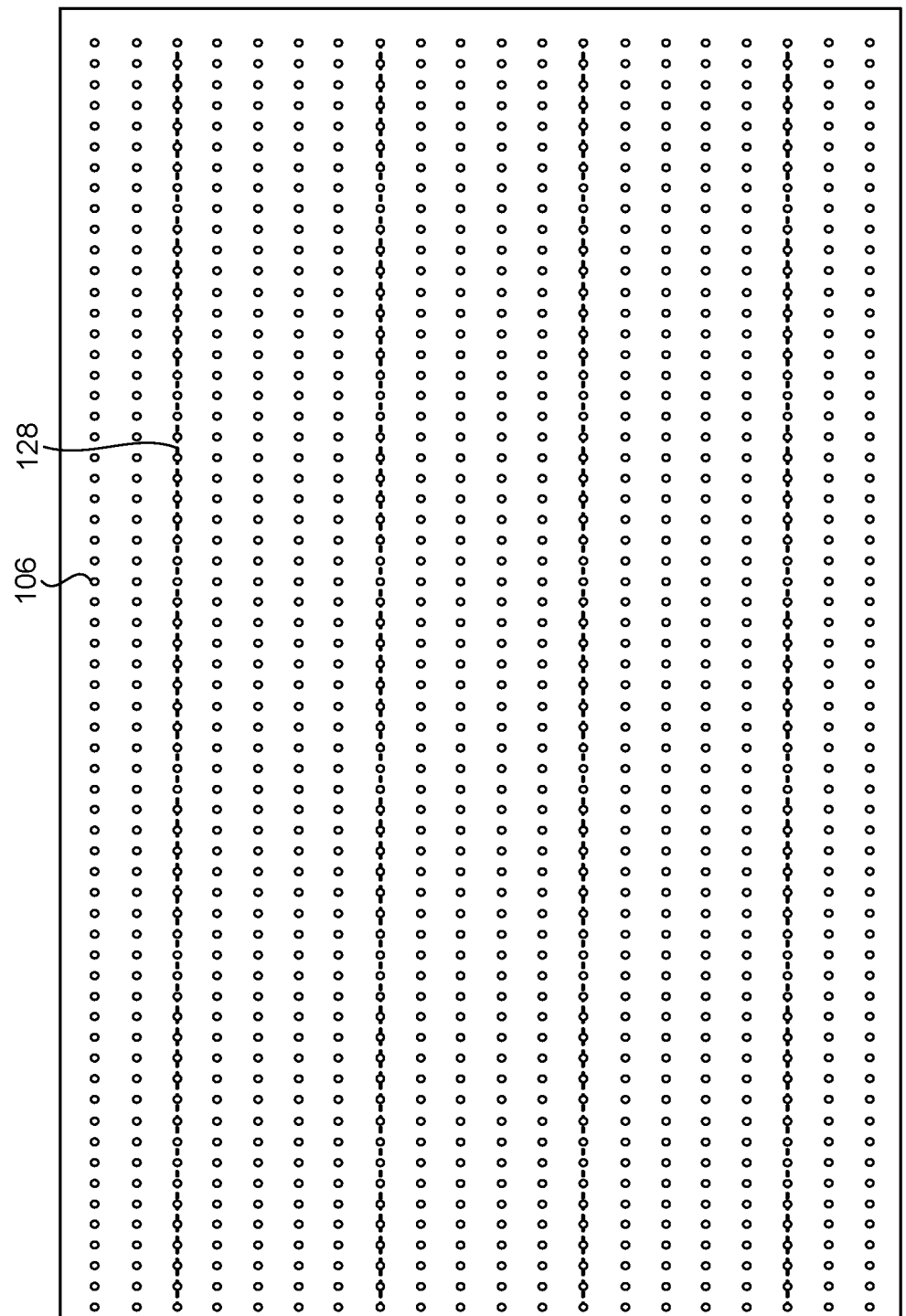
Figure 12C:
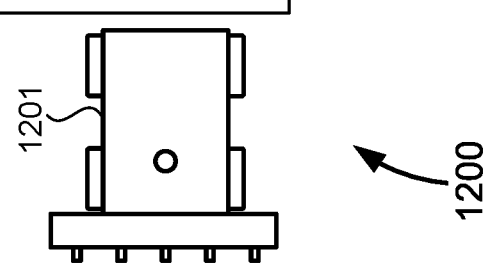
Figure 12D:
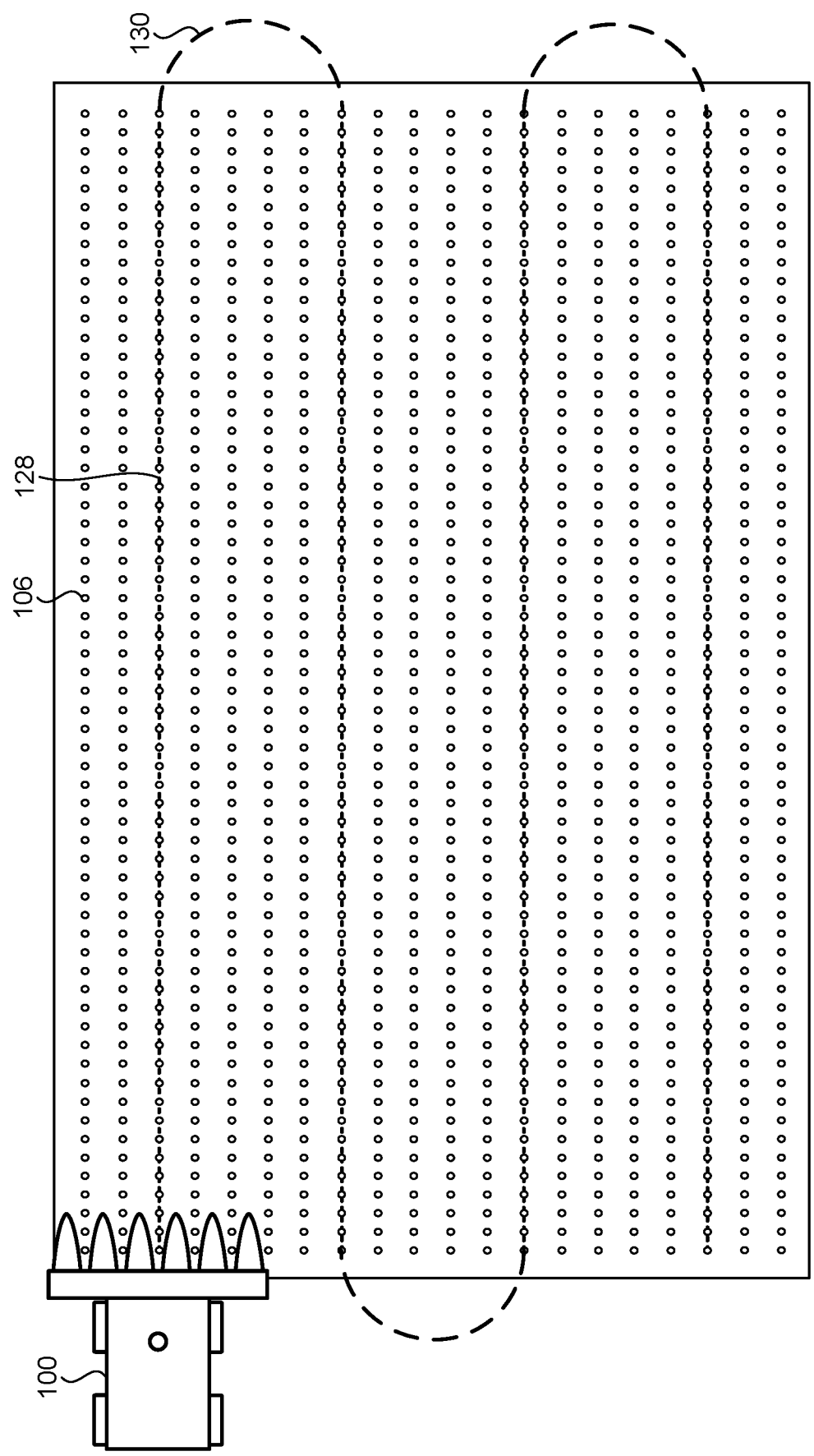
Figure 12E:
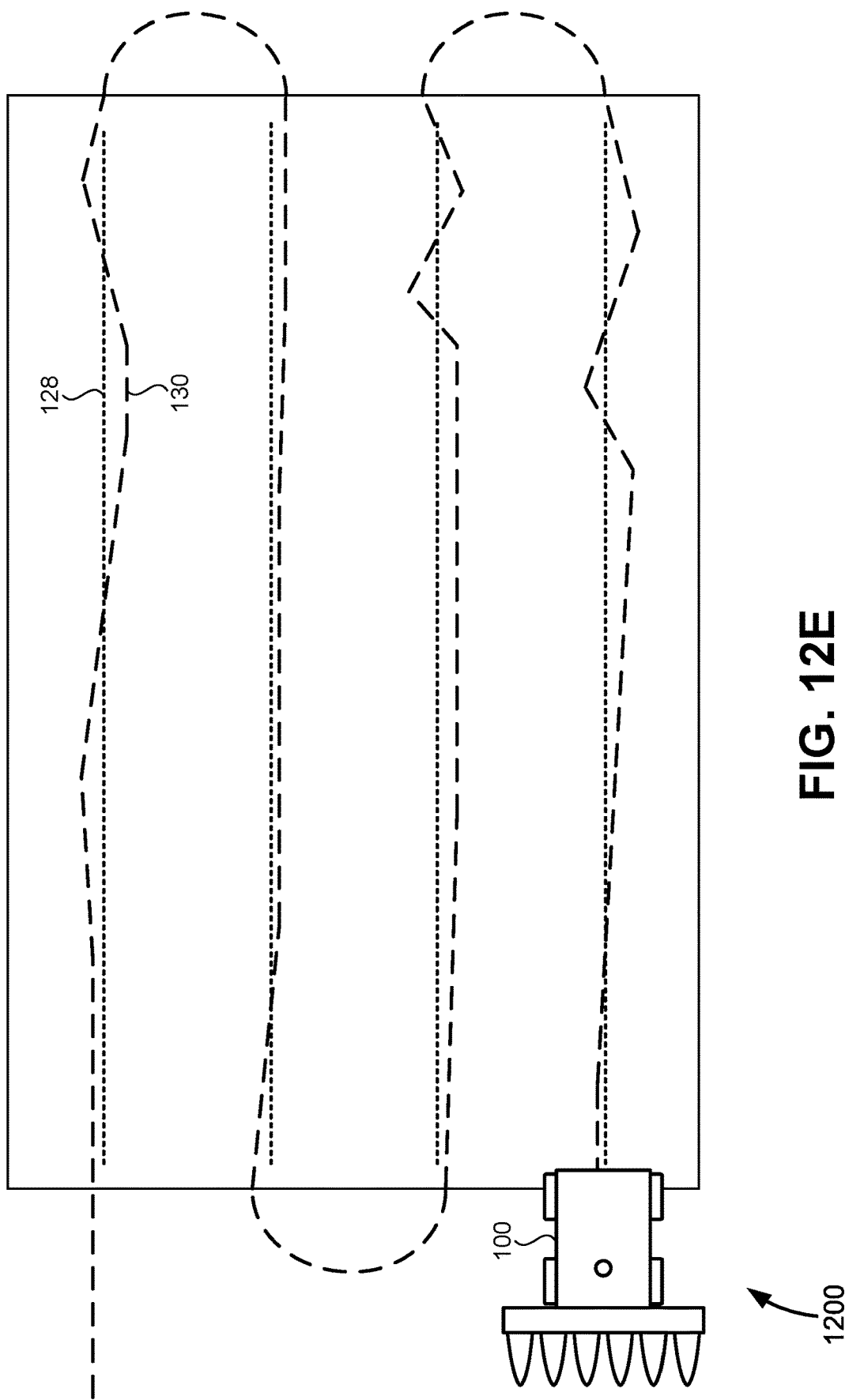

FIGS. 12A-12E illustrate various steps for harvesting crops planted in a field 1200, according to some embodiments of the present disclosure. In FIG. 12A, contour lines show varying elevations within field 1200. In FIG. 12B, a planter 1201 having a GNSS receiver 1202 is brought to field 1200. GNSS receiver 1202 may be similar to GNSS receiver 114. In FIG. 12C, planter 1201 plants crops 106 and records crop line 128. In FIG. 12D, mobile agricultural machine 100 is brought to field 1200 and guidance line 130 is initialized to crop line 128. In FIG. 12E, while incorporating orientation corrections resulting from varying elevations, mobile agricultural machine 100 harvests field 1200 while steering such that guidance point 136 (or modified guidance point 138) aligns with guidance line 130.

Figure 13:
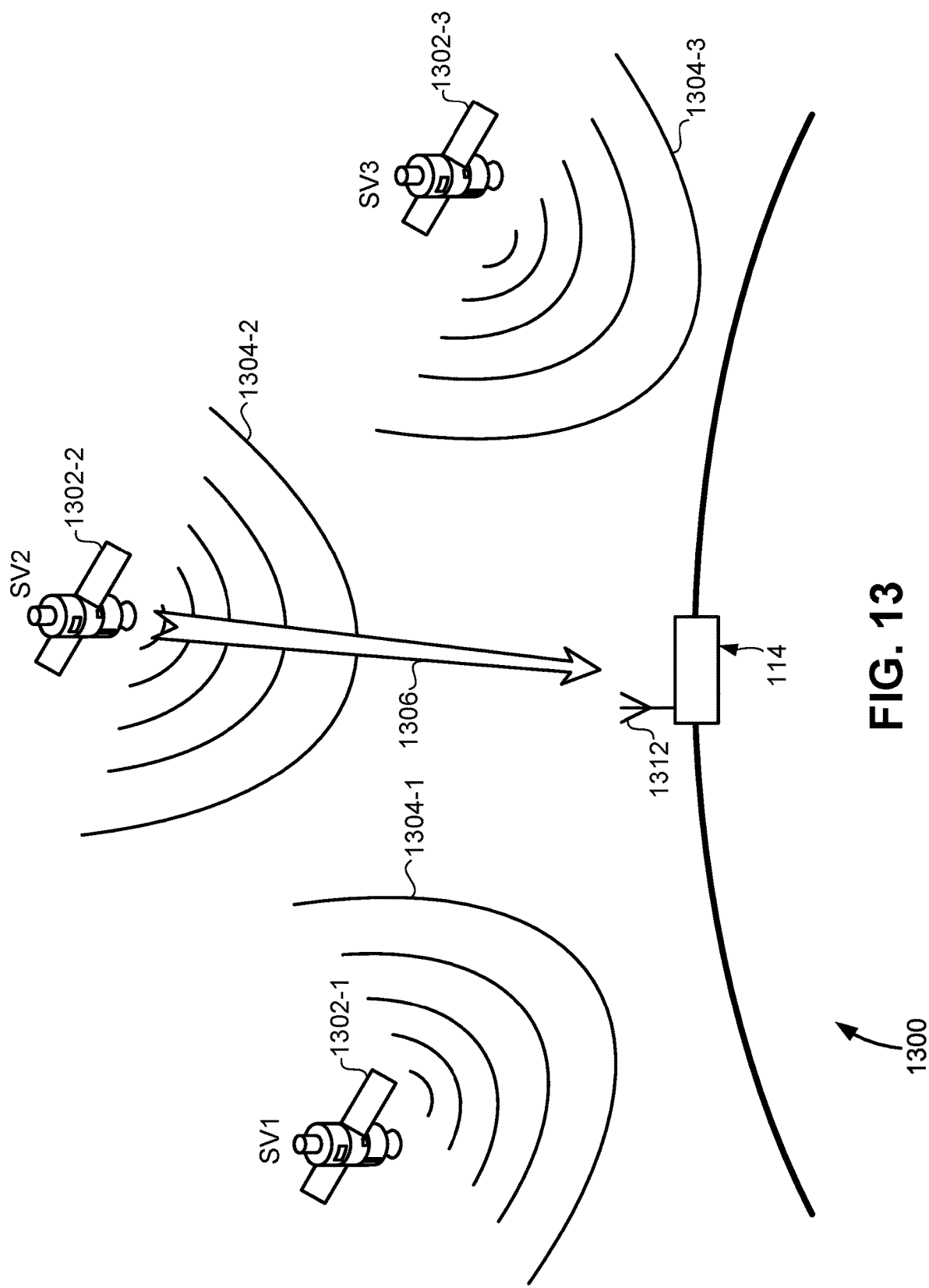
FIG. 13 illustrates a global navigation satellite system (GNSS), according to some embodiments of the present disclosure.

FIG. 13 illustrates a GNSS 1300, according to some embodiments of the present disclosure. GNSS 1300 includes one or more GNSS satellites 1302, i.e., space vehicles (SV), in orbit above a GNSS receiver 114. GNSS satellites 1302 continuously, periodically, or intermittently broadcast wireless signals 1304 containing PRN codes modulated onto carrier frequencies (e.g., L1 and/or L2 carrier frequencies). Broadcasted wireless signals 1304 include both direct wireless signals 1306, i.e., signals transmitted and received without reflection off objects, and reflected wireless signals, i.e., signals received by GNSS receiver 114 after reflection off at least one object. Direct wireless signals 1306 and reflected wireless signals are received by an antenna 1312 positioned within, on, or near GNSS receiver 114, which may be a geodetic antenna, a rover antenna, or a handheld receiver antenna, among other possibilities. Wireless signals 1304 corresponding to different GNSS satellites 1302 may include different PRN codes that identify a particular GNSS satellite 1302 such that GNSS receiver 114 may associate different distance estimates to different GNSS satellites 1302. For example, GNSS satellite 1302-1 broadcasts wireless signals 1304-1 which contain a different PRN code than the PRN code contained in wireless signals 1304-2 broadcasted by GNSS satellite 1302-2. Similarly, GNSS satellite 1302-3 broadcasts wireless signals 1304-3 which contain a different PRN code than the PRN codes contained in wireless signals 1304-1 and 1304-2 broadcasted by GNSS satellites 1302-1 and 1302-2, respectively.

Merely by way of example, GNSS receiver 114 may use the three distance estimates between itself and GNSS satellites 1302-1, 1302-2, and 1302-3 to generate a position estimate through a process called trilateration. In some instances, trilateration involves generating three spheres having center locations corresponding to the locations of the GNSS satellites 1302 and radii corresponding to the distance estimates. The three spheres intersect at two locations, one of which is more plausible than the other given the position of the earth. The less plausible location is disregarded and the more plausible location is used as the position estimate for GNSS receiver 114. The position estimate may be continuously, periodically, or intermittently updated by generating new distance estimates and performing trilateration using the new distance estimates. Subsequent position estimates may benefit from previous position estimates through filtering processes (e.g., Kalman filtering) capable of improving position estimate accuracy. Position estimates may also be determined using other techniques. In practice, a fourth satellite may be observed to estimate the receiver clock error with respect to the satellite system time.

Figure 14:
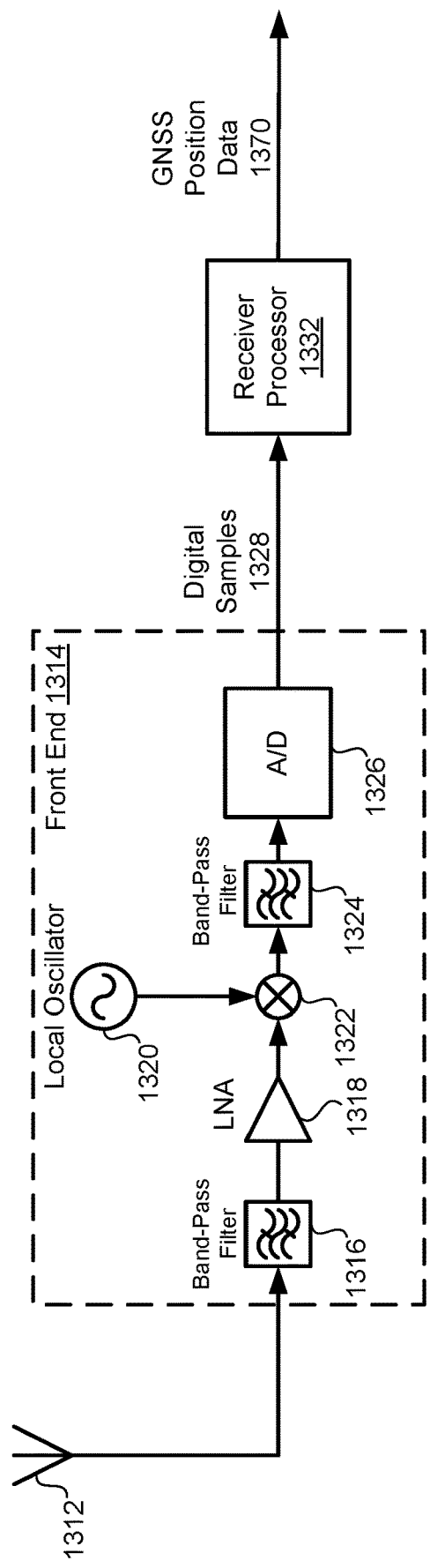
FIG. 14 illustrates a block diagram of a GNSS receiver, according to some embodiments of the present disclosure.

FIG. 14 illustrates a block diagram of GNSS receiver 114, according to some embodiments of the present disclosure. In some embodiments, GNSS receiver 114 includes antenna 1312 for receiving wireless signals 1304 and sending/routing a signal related to wireless signals 1304 to an RF front end 1314. Antenna 1312 may be linearly or circularly polarized, may be mounted or embedded, may be a single antenna or an array antenna, may have a narrow or wide bandwidth, among other possibilities. RF front ends are well known in the art, and in some instances include a band-pass filter 1316 for initially filtering out undesirable frequency components outside the frequencies of interest, a low-noise amplifier (LNA) 1318 for amplifying the received signal, a local oscillator 1320 and a mixer 1322 for down converting the received signal from RF to intermediate frequencies (IF), a band-pass filter 1324 for removing frequency components outside IF, and an analog-to-digital (A/D) converter 1326 for sampling the received signal to generate digital samples 1328.

In some instances, RF front end 1314 includes additional or fewer components than that shown in FIG. 2. For example, RF front end 1314 may include a second local oscillator (90 degrees out of phase with respect to local oscillator 1320), a second mixer, a second band-pass filter, and a second A/D converter for generating digital samples corresponding to the quadrature component of wireless signals 1304. Digital samples corresponding to the in-phase component of wireless signals 1304 and digital samples corresponding to the quadrature component of wireless signals 1304 may both be sent to receiver processor 1332. In some embodiments, digital samples corresponding to both in-phase and quadrature components may be included in digital samples 1328. In some embodiments, receiver processor 1332 may include one or more correlators.

Other components within RF front end 1314 may include a phase-locked loop (PLL) for synchronizing the phase of local oscillator 1320 with the phase of the received signal, and a phase shifter for generating a second mixing signal using local oscillator 1320 that is 90 degrees out of phase with local oscillator 1320. In some embodiments, RF front end 1314 does not include band-pass filter 1316 and LNA 1318. In some embodiments, A/D converter 1326 is coupled directly to antenna 1312 and samples the RF signal directly without down-conversion to IF. In some embodiments, RF front end 1314 only includes band-pass filter 1316 and A/D converter 1326. Other possible configurations of RF front end 1314 are possible.

Digital samples 1328 generated by RF front end 1314 are sent to receiver processor 1332. In some embodiments, receiver processor 1332 performs one or more correlations on digital samples 1328 using local codes to generate distance estimates between GNSS receiver 114 and GNSS satellites 1302. In some embodiments, one or more components of receiver processor 1332 (such as, for example, one or more correlators) include specific pieces of hardware, such as an application-specific integrated circuit (ASIC) or a field-programmable gate array (FPGA). In some embodiments, operations performed by receiver processor 1332 are performed entirely in software using digital signal processing (DSP) techniques. After generating the distance estimates, receiver processor 1332 may perform trilateration to generate a position estimate for GNSS receiver 114. After generating at least one position estimate, receiver processor 1332 may output GNSS position data 1370 comprising a plurality of GNSS points (i.e., position estimates). Each of the plurality of GNSS points may be a 3D coordinate represented by three real numbers. In some embodiments, the three numbers may correspond to latitude, longitude, and elevation. In other embodiments, the three numbers may correspond to X, Y, and Z positions. GNSS position data 1370 may be outputted to be displayed to a user, transmitted to a separate device (e.g., computer, smartphone, server, etc.) via a wired or wireless connection, or further processed, among other possibilities.

Figure 15:
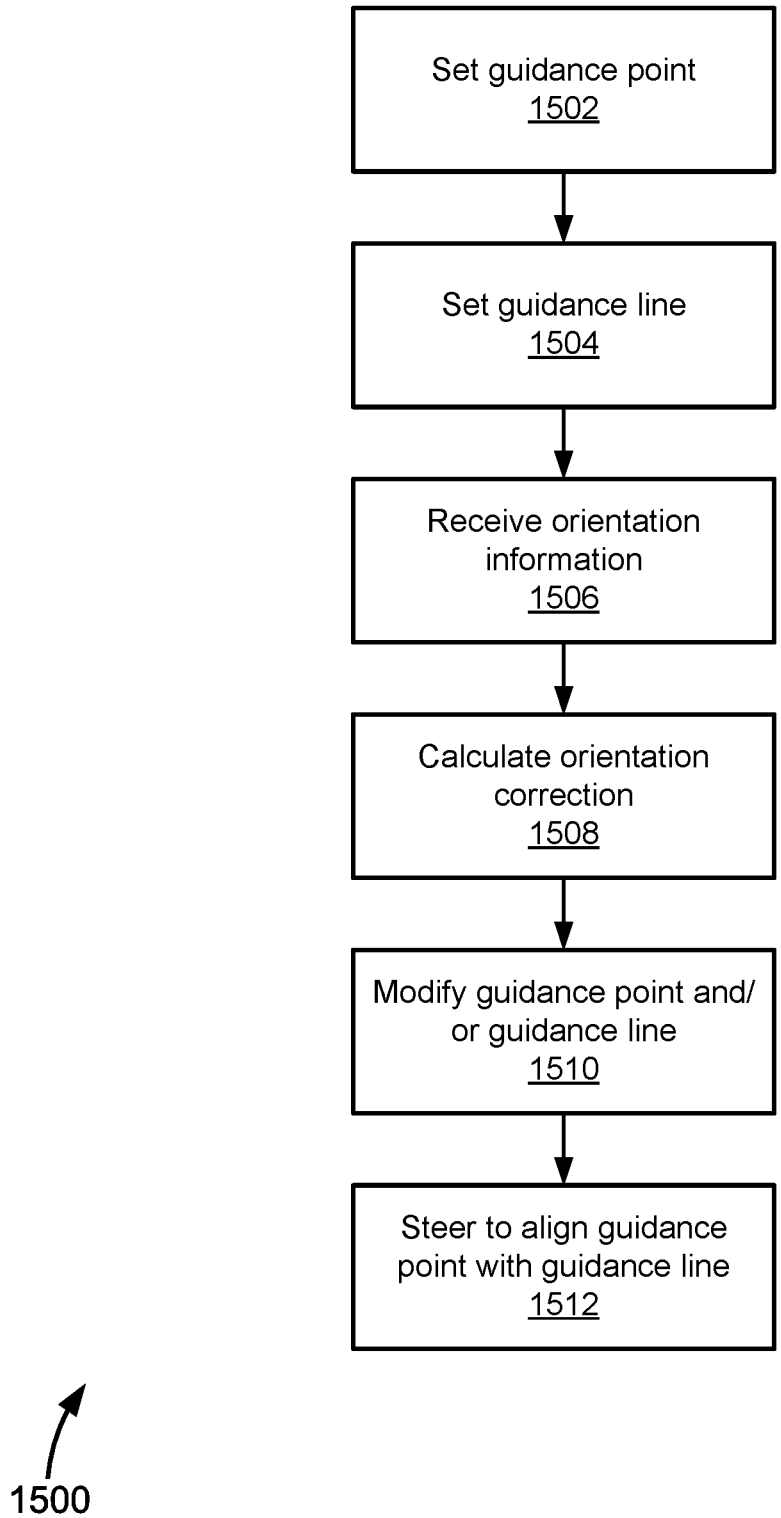
FIG. 15 illustrates a block diagram of a method for steering a mobile agricultural machine to align a guidance point with a guidance line, according to some embodiments of the present disclosure.

FIG. 15 illustrates a block diagram of a method 1500 for steering a mobile agricultural machine to align a guidance point with a guidance line, according to some embodiments of the present disclosure. Steps of method 1500 need not be performed in the order shown, and not all steps need be performed during performance of method 1500.

At step 1502, the guidance point (e.g., guidance point 136) is set by a steering unit (e.g., steering unit 110). In some embodiments, setting the guidance point may include establishing a point of reference on (generally on the header of the mobile agricultural machine) or within a threshold distance of the mobile agricultural machine near which crops are to be received (e.g., midpoint between adjacent cones of the header). Setting the guidance point may include initializing the guidance point based on a first received geospatial position (e.g., geospatial position 122) of a GNSS receiver (e.g., GNSS receiver 114) and a known physical relationship between the GNSS receiver and the guidance point. In some embodiments, setting the guidance point may include updating a previous guidance point based on a second received geospatial position of the GNSS receiver and the known physical relationship between the GNSS receiver and the guidance point. In some embodiments, the guidance point is a 2D or 3D coordinate.

At step 1504, the guidance line (e.g., guidance line 130) is set by the steering unit. Setting the guidance line may include receiving, from a central computing system (e.g., central computing system 134), a crop line (e.g., crop line 128) corresponding to geospatial positions of a plurality of planted crops (e.g., crop 106) and setting at least part of the guidance line to at least part of the crop line. In some embodiments, setting the guidance line includes receiving the guidance line from the central computing system. In such embodiments, the guidance line may be generated by the central computing system with the intended effect of guiding the mobile agricultural machine to harvest the crops from an entire field (e.g., field 1200) or a portion of a field. In some embodiments, setting the guidance line may include determining geospatial positions of the plurality of crops using a path sensor (e.g., path sensor 118). In such embodiments, the path sensor may be positioned near ground level at a base of the mobile agricultural machine such that the determined geospatial positions of the plurality of crops correspond to positions at ground level.

At step 1506, orientation information (e.g., orientation information 124) is received by the steering unit from an orientation sensor (e.g., orientation sensor 116) mounted on the mobile agricultural machine. The orientation information may include one or both of a pitch angle and a roll angle of the mobile agricultural machine. The orientation information may be detected by the orientation sensor at regular intervals, at irregular intervals, or in response to a request by the steering unit. In some embodiments, the orientation information may be periodically detected by the orientation sensor and only sent to the steering unit when a change in the orientation information is detected.

At step 1508, an orientation correction is calculated by the steering unit based on the orientation information. The orientation correction may include one or more antenna-based orientation corrections and/or one or more header-based orientation corrections. Antenna-based orientation corrections may be calculated based on a height of the GNSS receiver (e.g., $H_{ANT}$) and the orientation information, and header-based orientation corrections may be calculated based on a height of a header (e.g., $H_{HEAD}$) of the mobile agricultural machine and the orientation information. The height of the header may correspond to the height of a location on the header at which the header makes first contact with a crop. In some embodiments, the height of the header is measured from the ground to the bottom of a cone (e.g., cone 104) of the header. In some embodiments, the height of the header is measured from the ground to a path sensor mounted on the header.

At step 1510, the guidance point is modified using the orientation correction and/or the guidance line is modified using the orientation correction. Where the orientation correction includes multiple corrections, a first portion of the orientation corrections may be used to modify the guidance point and a second portion of the orientation corrections may be used to modify the guidance line. Based on the calculation approach used to calculate the orientation correction, the orientation correction may be either added or subtracted to the guidance point and/or the guidance line. In some embodiments, the guidance point and/or the guidance line is immediately modified upon calculation of the orientation correction, even while the mobile agricultural machine is being operated and steered to align a previous guidance point with a previous guidance line.

At step 1512, the mobile agricultural machine is steered to align the modified guidance point with the guidance line and/or to align the guidance point with the modified guidance line. This may include sending a steering instruction (e.g., steering instruction 122) from the steering unit to a vehicle control system (e.g., vehicle control system 112). In some embodiments, the steering unit may control the vehicle directly without generating a steering instruction. Steering the mobile agricultural machine may not result in perfect alignment between the modified guidance point and the guidance line and/or the guidance point and the modified guidance line, but may result in alignment within a particular threshold (e.g., 5%).

Figure 16:
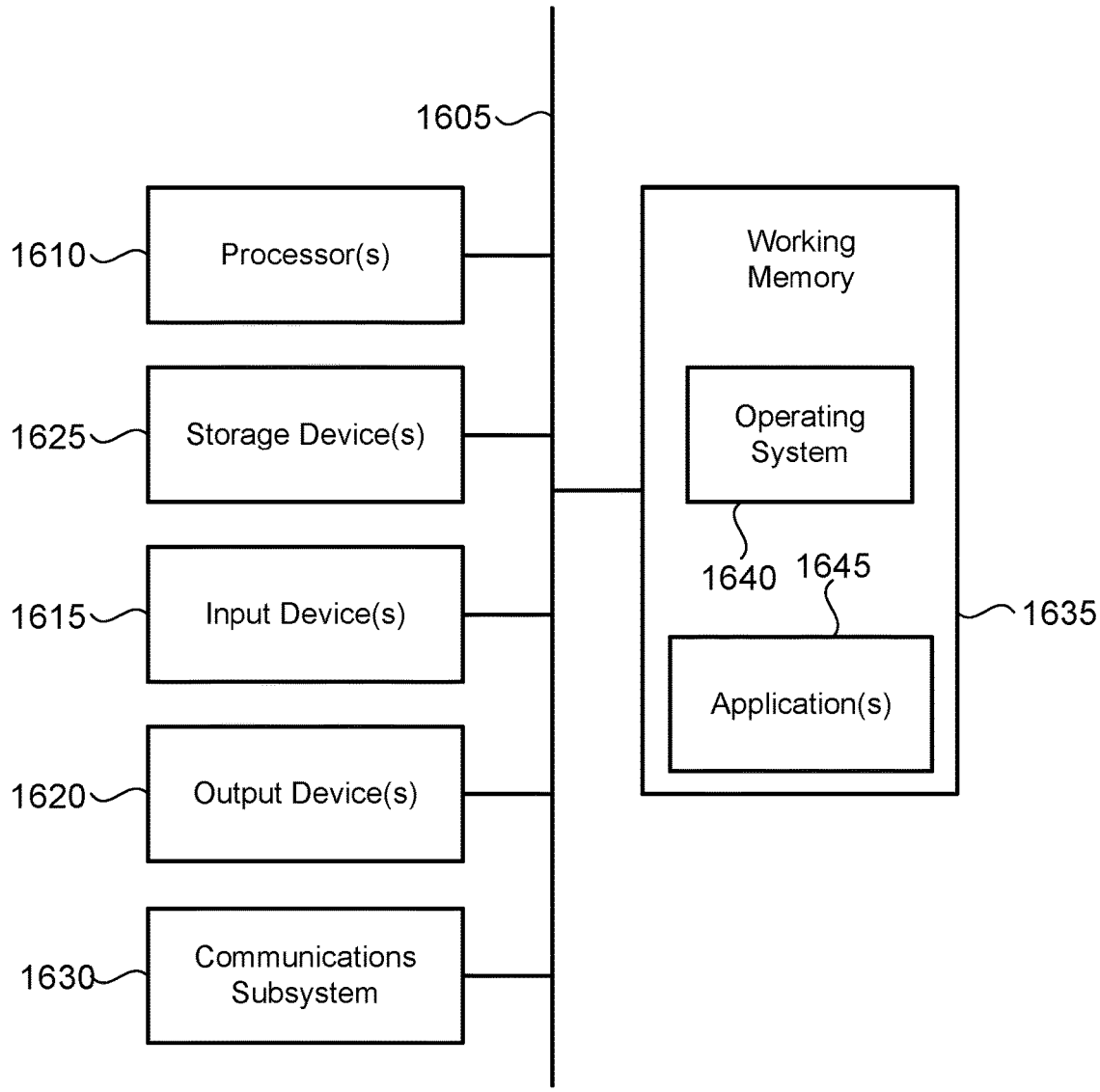
FIG. 16 illustrates a simplified computer system, according to an embodiment of the present disclosure.

FIG. 16 illustrates a simplified computer system, according to an embodiment of the present disclosure. A computer system 1600 as illustrated in FIG. 16 may be incorporated into devices such as GNSS receiver 114, orientation sensor 116, steering unit 110, central computing system 134, or some other device described herein. FIG. 16 provides a schematic illustration of one embodiment of a computer system 1600 that can perform some or all of the steps of the methods provided by various embodiments. It should be noted that FIG. 16 is meant only to provide a generalized illustration of various components, any or all of which may be utilized as appropriate. FIG. 16, therefore, broadly illustrates how individual system elements may be implemented in a relatively separated or more integrated manner.

The computer system 1600 is shown comprising hardware elements that can be electrically coupled via a bus 1605, or may otherwise be in communication, as appropriate. The hardware elements may include one or more processors 1610, including without limitation one or more general-purpose processors and/or one or more special-purpose processors such as digital signal processing chips, graphics acceleration processors, and/or the like; one or more input devices 1615, which can include, without limitation a mouse, a keyboard, a camera, and/or the like; and one or more output devices 1620, which can include, without limitation a display device, a printer, and/or the like.

The computer system 1600 may further include and/or be in communication with one or more non-transitory storage devices 1625, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 1600 might also include a communications subsystem 1630, which can include, without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 1630 may include one or more input and/or output communication interfaces to permit data to be exchanged with a network such as the network described below to name one example, to other computer systems, and/or any other devices described herein. Depending on the desired functionality and/or other implementation concerns, a portable electronic device or similar device may communicate image and/or other information via the communications subsystem 1630. In other embodiments, a portable electronic device, e.g. the first electronic device, may be incorporated into the computer system 1600, e.g., an electronic device as an input device 1615. In some embodiments, the computer system 1600 will further comprise a working memory 1635, which can include a RAM or ROM device, as described above.

The computer system 1600 also can include software elements, shown as being currently located within the working memory 1635, including an operating system 1640, device drivers, executable libraries, and/or other code, such as one or more application programs 1645, which may comprise computer programs provided by various embodiments, and/or may be designed to implement methods, and/or configure systems, provided by other embodiments, as described herein. Merely by way of example, one or more procedures described with respect to the methods discussed above can be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 1625 described above. In some cases, the storage medium might be incorporated within a computer system, such as computer system 1600. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 1600 and/or might take the form of source and/or installable code, which, upon compilation and/or installation on the computer system 1600 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware or software including portable software, such as applets, etc., or both. Further, connection to other computing devices such as network input/output devices may be employed.

As mentioned above, in one aspect, some embodiments may employ a computer system such as the computer system 1600 to perform methods in accordance with various embodiments of the technology. According to a set of embodiments, some or all of the procedures of such methods are performed by the computer system 1600 in response to processor 1610 executing one or more sequences of one or more instructions, which might be incorporated into the operating system 1640 and/or other code, such as an application program 1645, contained in the working memory 1635. Such instructions may be read into the working memory 1635 from another computer-readable medium, such as one or more of the storage device(s) 1625. Merely by way of example, execution of the sequences of instructions contained in the working memory 1635 might cause the processor(s) 1610 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 1600, various computer-readable media might be involved in providing instructions/code to processor(s) 1610 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1625. Volatile media include, without limitation, dynamic memory, such as the working memory 1635.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1600.

The communications subsystem 1630 and/or components thereof generally will receive signals, and the bus 1605 then might carry the signals and/or the data, instructions, etc. carried by the signals to the working memory 1635, from which the processor(s) 1610 retrieves and executes the instructions. The instructions received by the working memory 1635 may optionally be stored on a non-transitory storage device 1625 either before or after execution by the processor(s) 1610.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method for steering a mobile agricultural machine to align a guidance point with a guidance line, the method comprising:
    setting the guidance point;
    setting the guidance line;
    receiving, from an orientation sensor mounted on the mobile agricultural machine, orientation information including one or both of a pitch angle and a roll angle of the mobile agricultural machine;
    receiving, from a global navigation satellite system (GNSS) receiver mounted on the mobile agricultural machine, a geospatial position of the GNSS receiver;
    calculating an orientation correction based on the orientation information and a predetermined height of the GNSS receiver; and
    performing at least one of:
        modifying the guidance point using the orientation correction and steering the mobile agricultural machine to align the modified guidance point with the guidance line; or
        modifying the guidance line using the orientation correction and steering the mobile agricultural machine to align the guidance point with the modified guidance line.

2. The method of claim 1, wherein setting the guidance point includes:
    setting the guidance point based on a known physical relationship between the GNSS receiver and the guidance point.

3. The method of claim 1, wherein setting the guidance line includes:
    receiving a crop line corresponding to geospatial positions of a plurality of planted crops; and
    setting at least part of the guidance line equal to at least part of the crop line.

4. The method of claim 1, wherein calculating the orientation correction includes:
calculating an antenna-based orientation correction based on the predetermined height of the GNSS receiver and the orientation information, where the orientation correction includes the antenna-based orientation correction.

5. The method of claim 4, wherein calculating the orientation correction includes:
calculating a header-based orientation correction based on a height of a header of the mobile agricultural machine and the orientation information, wherein the orientation correction includes both the antenna-based orientation correction and the header-based orientation correction.

6. The method of claim 1, further comprising:
receiving a misalignment signal from a contact-based path sensor mounted on a header of the mobile agricultural machine;
calculating a path correction based on the misalignment signal; and
modifying one or both of the guidance point and the guidance line using the path correction.

7. A system for steering a mobile agricultural machine to align a guidance point with a guidance line, the system comprising:
an orientation sensor mounted on the mobile agricultural machine;
a global navigation satellite system (GNSS) receiver mounted on the mobile agricultural machine; and
one or more processors in data communication with the orientation sensor, wherein the one or more processors are configured to perform operations including:
setting the guidance point;
setting the guidance line;
receiving, from the orientation sensor, orientation information including one or both of a pitch angle and a roll angle of the mobile agricultural machine;
receiving, from the GNSS receiver, a geospatial position of the GNSS receiver;
calculating an orientation correction based on the orientation information and a predetermined height of the GNSS receiver; and
performing at least one of:
modifying the guidance point using the orientation correction and steering the mobile agricultural machine to align the modified guidance point with the guidance line; or
modifying the guidance line using the orientation correction and steering the mobile agricultural machine to align the guidance point with the modified guidance line.

8. The system of claim 7, wherein setting the guidance point includes:
setting the guidance point based on a known physical relationship between the GNSS receiver and the guidance point.

9. The system of claim 7, wherein setting the guidance line includes:
receiving a crop line corresponding to geospatial positions of a plurality of planted crops; and
setting at least part of the guidance line equal to at least part of the crop line.

10. The system of claim 7, wherein calculating the orientation correction includes:
calculating an antenna-based orientation correction based on the predetermined height of the GNSS receiver and the orientation information, where the orientation correction includes the antenna-based orientation correction.

11. The system of claim 10, wherein calculating the orientation correction includes:
calculating a header-based orientation correction based on a height of a header of the mobile agricultural machine and the orientation information, wherein the orientation correction includes both the antenna-based orientation correction and the header-based orientation correction.

12. The system of claim 7, further comprising a contact-based path sensor mounted on a header of the mobile agricultural machine, and wherein the operations further comprise:
receiving a misalignment signal from a contact-based path sensor mounted on a header of the mobile agricultural machine;
calculating a path correction based on the misalignment signal; and
modifying one or both of the guidance point and the guidance line using the path correction.

13. A non-transitory computer readable medium comprising instructions that, when executed by a processing unit, cause the processing unit to steer a mobile agricultural machine to align a guidance point with a guidance line by performing operations comprising:
setting the guidance point;
setting the guidance line;
receiving, from an orientation sensor mounted on the mobile agricultural machine, orientation information including one or both of a pitch angle and a roll angle of the mobile agricultural machine;
receiving, from a global navigation satellite system (GNSS) receiver mounted on the mobile agricultural machine, a geospatial position of the GNSS receiver;
calculating an orientation correction based on the orientation information and a predetermined height of the GNSS receiver; and
performing at least one of:
modifying the guidance point using the orientation correction and steering the mobile agricultural machine to align the modified guidance point with the guidance line; or
modifying the guidance line using the orientation correction and steering the mobile agricultural machine to align the guidance point with the modified guidance line.

14. The non-transitory computer readable medium of claim 13, wherein setting the guidance point includes:
setting the guidance point based on a known physical relationship between the GNSS receiver and the guidance point.

15. The non-transitory computer readable medium of claim 13, wherein setting the guidance line includes:
receiving a crop line corresponding to geospatial positions of a plurality of planted crops; and
setting at least part of the guidance line equal to at least part of the crop line.

16. The non-transitory computer readable medium of claim 13, wherein calculating the orientation correction includes:
calculating an antenna-based orientation correction based on the predetermined height of the GNSS receiver and the orientation information, where the orientation correction includes the antenna-based orientation correction.

17. The non-transitory computer readable medium of claim 16, wherein calculating the orientation correction includes:
 calculating a header-based orientation correction based on a height of a header of the mobile agricultural machine and the orientation information, wherein the orientation correction includes both the antenna-based orientation correction and the header-based orientation correction.

\* \* \* \* \*